US007359507B2

(12) United States Patent
Kaliski

(10) Patent No.: US 7,359,507 B2
(45) Date of Patent: Apr. 15, 2008

(54) SERVER-ASSISTED REGENERATION OF A STRONG SECRET FROM A WEAK SECRET

(75) Inventor: Burton S. Kaliski, Wellesley, MA (US)

(73) Assignee: RSA Security Inc., Bedford, MA (US)

( * ) Notice: Subject to any disclaimer, the term of this patent is extended or adjusted under 35 U.S.C. 154(b) by 718 days.

(21) Appl. No.: 09/804,460

(22) Filed: Mar. 12, 2001

(65) Prior Publication Data

US 2001/0055388 A1    Dec. 27, 2001

Related U.S. Application Data

(60) Provisional application No. 60/188,458, filed on Mar. 10, 2000.

(51) Int. Cl.
*H04K 1/00* (2006.01)
*H04L 9/00* (2006.01)
(52) U.S. Cl. .......................................... 380/30; 380/28
(58) Field of Classification Search .................. 380/44, 380/30, 28
See application file for complete search history.

(56) References Cited

U.S. PATENT DOCUMENTS

| | | | | |
|---|---|---|---|---|
| 4,424,414 A | | 1/1984 | Hellman et al. | 178/22.11 |
| 4,567,600 A | | 1/1986 | Massey et al. | 375/2.1 |
| 4,606,042 A | * | 8/1986 | Kahn et al. | 380/37 |
| 4,720,860 A | | 1/1988 | Weiss | 380/23 |
| 4,759,063 A | | 7/1988 | Chaum | 380/30 |
| 4,885,778 A | | 12/1989 | Weiss | 380/48 |
| 4,947,430 A | | 8/1990 | Chaum | 380/25 |
| 5,023,908 A | | 6/1991 | Weiss | 380/23 |
| 5,168,520 A | | 12/1992 | Weiss | 380/23 |
| 5,222,140 A | | 6/1993 | Beller et al. | 380/30 |
| 5,241,599 A | | 8/1993 | Bellovin et al. | 380/21 |
| 5,351,298 A | * | 9/1994 | Smith | 380/30 |
| 5,367,572 A | | 11/1994 | Weiss | 380/23 |
| 5,373,558 A | * | 12/1994 | Chaum | 713/180 |
| 5,440,635 A | | 8/1995 | Bellovin et al. | 380/25 |
| 5,485,519 A | | 1/1996 | Weiss | 380/23 |

(Continued)

OTHER PUBLICATIONS

Bellovin and Merritt, "*Encrypted Key Exchange: Password-Based Protocols Secure Against Dictionary Attacks*", (pp. 72-84); Proceedings of the IEEE Symposium of Research in Security and Privacy, May 1992.

(Continued)

*Primary Examiner*—Kambiz Zand
*Assistant Examiner*—Christopher J Brown
(74) *Attorney, Agent, or Firm*—BainwoodHuang

(57) ABSTRACT

Methods for regenerating a strong secret for a user, based on input of a weak secret, such as a password, are assisted by communications exchanges with a set of independent servers. Each server holds a distinct secret value (i.e., server secret data). The strong secret is a function of the user's weak secret and of the server secret data, and a would-be attacker cannot feasibly compute the strong secret without access to both the user's weak secret and the server secret data. Any attacker has only a limited opportunity to guess the weak secret, even if he has access to all messages transmitted in the generation and regeneration processes plus a subset (but not all) of the server secret data.

40 Claims, 8 Drawing Sheets

U.S. PATENT DOCUMENTS

| | | | | | |
|---|---|---|---|---|---|
| 5,602,918 | A | * | 2/1997 | Chen et al. | 713/153 |
| 5,903,721 | A | * | 5/1999 | Sixtus | 713/201 |
| 5,953,420 | A | * | 9/1999 | Matyas et al. | 713/171 |
| 6,091,819 | A | * | 7/2000 | Venkatesan et al. | 380/28 |
| 6,240,184 | B1 | * | 5/2001 | Huynh et al. | 380/206 |
| 6,681,017 | B1 | * | 1/2004 | Matias et al. | 380/277 |
| 6,681,327 | B1 | * | 1/2004 | Jardin | 713/153 |
| 6,829,356 | B1 | * | 12/2004 | Ford | 380/44 |

OTHER PUBLICATIONS

Bellovin and Merritt, "*Augmented Encrypted Key Exchange: a Password-Based Protocol Secure Against Dictionary Attacks and Password File Compromise*", (pp. 1-7); AT&T Bell Laboratories Technical Report, 1994.

Boneh, DeMillo, and Lipton, "*On the Importance of Checking Cryptographic Protocols for Faults*" (extended abstract), (pp. 1-14); [online], [retrieved on Jul. 26, 2001], retrieved from the Internet URL:http://citeseer.nj.nec.com/boneh97importance.html.

Boneh and Franklin, "*Efficient Generation of Shared RSA Keys*", (pp. 1-21); [online], [retrieved Jul. 26, 2001], retrieved from the Internet URL:http//citeseer.nj.nex.com/358268.html.

Cannetti and Gennaro, "*Proactive Security: Long-Term Protection Against Break-Ins*", (pp. 1-8); RSA Laboratories, CryptoBytes, vol. 3, No. 1, Spring 1997.

Chaum, "*Security Without Identification: Transaction Systems to Make Big Brother Obsolete*," (pp. 1030-1044); Communications of the ACM, Oct. 1985, vol. 28 No. 10.

Chaum, "*Blind Signatures for Untraceable Payments*", (pp. 199-203); Advances in Cryptology, Proceedings of the Crypto '82, Workshop on the Theory and Application of Cryptographic Techniques, Santa Barbara, California, Aug. 23-25, 1982, New York 1983.

Coron, Naccache, and Stern, "*On the Security of RSA Padding*", (pp. 1-18); Advances in Cryptology, Proceedings of the Crypto '99, Springer 1999.

Desmedt and Odlyzko, "*A Chosen Text Attack on the RSA Cryptosystem and Some Discrete Logarithm Schemes*", (pp. 516-522); Advances in Cryptology, Proceedings of the Crypto '85, Springer-Verlag 1986.

Dierks and Allen, "*The TLS Protocol Version 1.0*", (pp. 1-75); IETF RFC 2246, Jan. 1999, [online], [retrieved Jul. 25, 2001], retrieved from the Internet URL: http://www.jetf.org/rfc/rfc2246.txt.

Frier, Karlton, and Kocher, "*The SSL 3.0 Protocol*", (pp. 1-62); Netscape Communications Corp., Nov. 18, 1996, [online], [retrieved Jul. 10, 2001], retrieved from the Internet URL:http://home.netscape.come/eng/ssl13/draft302.txt.

Gong, "*Increasing Availability and Security of an Authentication Service*," (pp. 657-662); IEEE Journal on Selected Areas in Communications, vol. 11, No. 5, Jun. 1993.

Gong, Lomas, Needham, and Saltzer, "*Protecting Poorly Chosen Secrets From Guessing Attacks*," (pp. 648-656); IEEE Journal of Selected Areas in Communications, vol. 11, No. 5, Jun. 1993.

Gong, "*Optimal Authentication Protocols Resistant to Password Guessing Attacks*", (pp. 24-29); Proceedings of the 8th IEEE Computer Security Foundations Workshop, Ireland, Jun. 13-15, 1995.

Halevi and Krayczyk, "*Public-Key Cryptography and Password Protocols*", (pp. 122-131); Proceedings of the Fifth ACM Conference on Computer and Communications Security, Nov. 3-5, 1998.

Heroux, "*A Private Key Storage Server for DCE—Functional Specification*", (pp. 1-73); Open Software Foundation, Request for Comments: 94.1, Nov. 1996, [online], [retrieved on Jul. 17, 2001], retrieved from the Internet URL:http://www.opengroup.org/rfc/mirror-rfc/rfc94.1.txt.

Herzberg, Jarecki, Krawczyk, and Yung, "*Proactive Secret Sharing Or: How to Cope With Perpetual Leakage*", (pp. 339-352); Advances in Cryptology, Proceedings of the Crypto '95, California, Aug. 1995, Springer 1995.

Jablon, "*Strong Password-Only Authenticated Key Exchange*", (pp. 1-24); ACM Computer Communications Review, Sep. 25, 1996.

Jabion, "*Extended Password Key Exchange Protocols Immune to Dictionary Attack*", (pp. 248-255); Proceedings of the WETICE '97 Enterprise Security Workshop, Jun. 1997.

Juels, Luby, and Ostrovsky, "*Security of Blind Digital Signatures*", (pp. 150-164); Advances in Cryptology, Proceedings of the Crypto '97, California, Aug. 1997, Springer 1997.

Kohl and Neuman, "*The Kerberos Network Authentication Service*", (pp. 1-105); RFC 1510, Internet Activities Board, Sep. 1993, [online], [retrieved on Jul. 10, 2001], retrieved from the Internet URL:http://www.ietf.org/rfc/rfc1510.txt.

Law, Menezes, Qu, Solinas, and Vanstone, "*An Efficient Protocol for Authenticated Key Agreement*", (pp. 1-16); Technical Report CORR 98-05, Dept. of C&O, University of Waterloo, Canada, Mar. 1998 (revised Aug. 28, 1998).

Lim and Lee, "*A Key Recovery Attack on Some Discrete Log-Based Schemes Using a Prime-Order Subgroup*", (pp. 249-263); Advances in Cryptology, Proceeding of the Crypto '97, vol. 1294 of Lecture Notes in Computer Science, Springer 1997.

Menezes, van Oorschot and Vanstone, "*Handbook of Applied Cryptography*", from Chapter 12 *Key Establishment Protocols*, Section 12.22 Protocol Shamie's no-key protocol, (p. 500); CRC Press 1997.

M'Raihi, "*Cost-Effective Payment Schemes With Privacy Regulation*", (pp. 266-275); Advances in Cryptology, Proceedings of ASIACRYPT ' 96, vol. 1163 of LNCS, 1996.

MacKenzie and Swarninathan, "*Secure Network Authentication With Password Identification*", (pp. 1-11); Submission to IEEE P1363 a working group, Jul. 30, 1999, [online], [retrieved Jul. 1, 2001], retrieved form the Internet URL:http://www.manta.ieee.org/groups/;1363/studygroup/passwd.html.

Monrose, Reiter, and Wetzel, "*Password Hardening Based on Keystroke Dynamics*", (pp. 73-82); Proceedins of the 6th ACM Conference on Computer and Communications Security, Nov. 1-4, 1999, Singapore [online], [retrieved on Sep. 6, 2000], retrieved from the Internet URL:http://www.acm.org/pubs/contents/proceedings/commsec/319709.

Perlman and Kaufman, "*Secure Password-Based Protocol for Downloading a Private Key*", Proceedings of the 1999 Network and Distributed System Security Symposium, Internet Society, Jan. 1999.

Pohlig and Hellman, "*An Improved Algorithm For Computing Logarithms Over GF(p) and Its Cryptographic Significance*", (pp. 106-110); IEEE Transactions on Information Theory, vol. 24, No. 1, Jan. 1978.

Pointcheval and Stern, "*Provably Secure Blind Signature Schemes*", (pp. 252-265); Adances in Cryptology, Proceedings of the ASIACRYPT '96, Kyongju, Korea, Nov. 1996, Springer 1996.

Rivest, Shamir, and Adleman, "*A Method for Obtaining Digitan Signatures and Public-Key Cryptosystems*," (pp. 120-126); Communications of the ACM, vol. 21, No. 2, Feb. 1978.

"*Skipjack and Kea Speifications*", (pp. 1-23); NIST, May 29, 1998, [online], [retrieved on Jul. 10, 2001], retrieved from the Internet, URL:http://csrc.nist.gov/encryption/skipjack-kea.htm.

Stadler, Piveteau, and Garnenisch, "*Fair Bling Signatures*", (pp. 209-219); Advances in Cryptology, Proceedings of the EUROCRYPT '95, International Conference on the Theory and Application of Cryptographic Techniques, Saint-Malo, France, May 21-25, 1995, Springer 1995.

von Solms and Naccache, "*On Blind Signatures and Perfect Crimes*", (pp. 581-583); Computers and Security, vol. 11, No. 6, 1992.

Wu, "*The Secure Remote Password Protocol*", (pp. 1-15); Proceedings of the 1998 Network and Distribtued System Security Symposium, Internet Society, Jan. 1998.

Zuccherato, "*Methods for Avoiding the 'Small Subgroup' Attacks on the Diffie- Hellman Key Agreement for S/MIMI*", (pp. 1-11); IETF Internet-Draft (work in progress), Jun. 1999, [online], [retrieved on Aug. 29, 2001], retrieved from the Internet URL:http://www.ietf.org/proceedings/99:ul/1-D/draft/ieft-smime-small-subgroup-ol.txt.

* cited by examiner

SERVER-ASSISTED REGENERATION OF A STRONG SECRET FROM A WEAK SECRET

RELATED APPLICATIONS

This application claims the benefit of U.S. Provisional Patent Application Ser. No. 60/188,458, "Server-Assisted Generation of a Strong Secret from a Password" by W. Ford and B. Kaliski, filed Mar. 10, 2000 which subject matter is incorporated herein by reference.

BACKGROUND OF THE INVENTION

1. Technical Field

This invention relates generally to the secure regeneration of a user's strong secret when the user supplies a corresponding weak secret, such as a user-chosen password. For example, in computer network applications, the strong secret might be an encryption key which is used to protect the user's highly sensitive private data (such as the user's private key used in public key cryptography). In this example, the invention relates to the secure regeneration of the encryption key (and the secure recovery of the user's private key) when the user supplies his password. As another example, the strong secret might be used by the user to authenticate to a server, by demonstrating to the server the user's ability to regenerate the strong secret, without that server needing to hold data that allows the weak secret to be attacked by exhaustive trials.

2. Background Art

As a result of the continuous development of new technologies, particularly in the areas of computer networks and communications, the use of large computer networks such as the Internet is becoming more widespread. This has resulted in an increase in electronic commerce and other electronic transactions conducted over these networks. It has also resulted in increased flexibility for users, as users may increasingly access these networks from any number of locations and/or devices. The increase in electronic transactions has resulted in a corresponding increased need for security for these transactions; but the increased flexibility imposes additional requirements on security since any security measures preferably would accommodate users even as they roam across the network.

In one common scenario, the user may access the computer network from many different locations and may wish to use his private key from each location. However, at each location, he may be accessing the network from a device (hereafter referred to as a "client terminal") which cannot or does not store any data for the user, other than for transitory periods. For example, an employee might access a company's central computer network from different terminals on the company's premises, or a consumer might access the Internet from any web browser or might access a private network from a consumer kiosk. The client terminal typically can be trusted to execute its code in a trustworthy manner, to maintain the secrecy of sensitive data (e.g., the user's private key or a secret shared with an application server) during the period in which the user is actively using that terminal, and to securely destroy sensitive data when the user has finished using it. Thus, the user's private data could be securely used at the client terminal if the client terminal could somehow securely obtain a copy of the private data.

In one approach, the private data is stored on some secure hardware storage or processing token, such as a smartcard. The hardware token is physically connected to the client terminal and the private data is made accessible to the client. This approach suffers from high cost and user inconvenience since dedicated hardware is required, thus making it inappropriate for many applications.

In another approach, the private data is recovered with the assistance of other devices connected to the network (hereafter referred to as "servers"). In one example, recovery of the private data is part of the user's session login process. The user authenticates by presenting a user account name and a password subject to modest (but not extreme) guessability controls. In particular, any party attempting a password guessing attack is limited to a small number of tries and, given this control, users can be permitted reasonably friendly password choices. Once the user is authenticated, the client terminal recovers the user's private data with the assistance of the servers.

The problem of recovering private data, such as a private key, into a stateless client terminal has been addressed in prior work through the use of a server which stores secret data for the client and facilitates the recovery process. Various protocols for using such servers, with different security and performance characteristics, were surveyed in R. Perlman and C. Kaufman, "Secure Password-Based Protocol for Downloading a Private Key," *Proc.* 1999 *Network and Distributed System Security Symposium*, Internet Society, January 1999. The protocols described in that work are primarily variants or derivatives of Bellovin and Merritt's EKE protocol (e.g., see S. Bellovin and M. Merritt, "Encrypted Key Exchange: Password-based protocols secure against dictionary attacks," *Proc. IEEE Symposium on Research in Security and Privacy*, May 1992; and S. Bellovin and M. Merritt, "Augmented Encrypted Key Exchange: a password-based protocol secure against dictionary attacks and password file compromise," *ATT Labs Technical Report,* 1994) and Jablon's SPEKE protocol (e.g., see D. Jablon, "Strong password-only authenticated key exchange," *ACM Computer Communications Review*, October 1996; and D. Jablon, "Extended Password Protocols Immune to Dictionary Attack," *Proc. of the WETICE '97 Enterprise Security Workshop*, June 1997. Related patents include U.S. Pat. No. 5,241,599 ("Cryptographic protocol for secure communications" by Bellovin and Merritt) and U.S. Pat. No. 5,440,635 ("Cryptographic protocol for remote authentication" by Bellovin and Merritt). Other related server-assisted secret recovery protocols have been proposed by Gong, et al. (e.g., L. Gong, T. M. A. Lomas, R. M. Needham, and J. H. Salzer, "Protecting Poorly Chosen Secrets from Guessing Attacks," *IEEE Journal on Selected Areas in Communications*, vol.11, no. 5, Jun. 1993, pp. 648-656; L. Gong, "Optimal Authentication Protocols Resistant to Password Guessing Attacks," *Proc. 8th IEEE Computer Security Foundations Workshop*, Ireland, Jun. 13, 1995, pp. 24-29; and L. Gong, "Increasing Availability and Security of an Authentication Service," *IEEE Journal on Selected Areas in Communications*, vol. 11, no. 5, June 1993, pp. 657-662); by Wu (e.g., T. Wu, "The Secure Remote Password Protocol," *Proc.* 1998 *Network and Distributed System Security Symposium*, Internet Society, January 1998, pp. 97-111), and by Halevi and Krawcyzk (e.g., S. Halevi and H. Krawczyk, "Public-key cryptography and password protocols. Public-key cryptography and password protocols," *Proceedings of the Fifth ACM Conference on Computer and Communications Security,* 1998).

However, all of the above methods suffer from a significant shortcoming. The server represents a major vulnerability. If a server operator, or someone who compromises a server, wishes to determine a user's password or private data (either of which will generally enable the attacker to masquerade as the user), viable attacks are possible, despite aspects of some approaches that minimize the sensitivity of the data stored on the server. For example, in certain of the work mentioned above, the server does not store the user's password but instead stores a value computed as a one-way function of the password. Anyone learning that value might be able to determine the password by exhaustively applying the one-way function to guessed passwords and comparing the result with the stored value. In general terms, the previously mentioned approaches suffer from the weakness that anyone who can access the server database or can disable any throttling or lockout mechanism on the server can try passwords exhaustively until a user's account on the server is penetrated.

In some application scenarios the above weakness can significantly undermine the attractiveness of the server-assisted approach to recovery of private data. For example, the above attack scenario significantly hampers the non-repudiation properties otherwise inherent in digital signature technology. If a roaming user digitally signs a action using the user's private key from a client terminal and later wishes to deny the user's digital signature, the user can plausibly claim that the server operator or someone who compromised the server obtained the user's private key as described above and digitally signed the transaction posing as the user. Risks and liability faced by a server operator are reduced if it can justifiably counter claims from users that it, or its personnel may have masqueraded as the user.

Thus there is a need for an approach that permits a client terminal to recover a user's private data with the assistance of servers while remaining resistant to attacks on the servers. More generally, the problem of recovering private data into a stateless client can be reduced to the problem of generating and regenerating strong secret data for a user from the user's weak secret data, such as a password. The strong secret can be used as an encryption key in a symmetric cryptosystem to encrypt and recover any amount of private data that might be held in an encrypted form in a widely accessible storage place.

There is also a need for approaches which permit a user to authenticate to an application server from a stateless client terminal on the basis of a presented password. Current approaches, such as the Kerberos authentication method (e.g., see J. T. Kohl and B. C. Neuman, *The Kerberos Network Authentication Service (V5)*, Request for Comments (RFC) 1510, Internet Activities Board, 1993), involve the user authenticating first to an authentication server and subsequently to an application server using a cryptographic "ticket" from the authentication server. However, these approaches suffer from the shortcoming that either the application server or an authentication server holds data which, if exposed to an attacker (either internal or external to the organization that operates the server), allows the attacker to exhaustively guess passwords and likely determine the user's password. These problems may be averted if the user authentication is based on a user presenting evidence of knowledge of strong secret data rather than weak secret data to the application server or authentication server.

There is also a need for approaches which allow a user to create a digital signature from a stateless client terminal into which a password is entered. One approach to satisfying this requirement is to recover the user's private key into the terminal as outlined above and to compute the digital signature in the client terminal. Another approach for satisfying the requirement, which does not require the private key to be assembled in one place, involves communications with multiple servers each of which holds an independent part of the user's signing private key. Such servers each generate part of the digital signature and the parts are combined in the client terminal to give the full digital signature. While relevant other work on such methods achieves the goal of not assembling the private key in one place, such work suffers from the weakness that one or more servers that participate in the signing process hold data that allows the user's password to be exhaustively attacked. Consequently, there is a risk that anyone who compromises any one such server can determine the user's password by exhaustive guessing, which, if successful, allows the attacker to forge digital signatures purporting to be from that user. The problem can be averted by authenticating to the servers that generate parts of the digital signature by demonstrating knowledge of a strong user secret, which may have been regenerated on the basis of presentation of a weak user secret, rather than by authenticating directly on the basis of the weak user secret itself.

Thus, there is a need for an approach that permits a client terminal to regenerate a user's strong secret data from weak secret data with the assistance of servers while remaining resistant to attacks on the servers.

DISCLOSURE OF INVENTION

In accordance with the present invention, a method for establishing (300,500) a user's (100) strong secret data to allow subsequent recovery (400,600) of the strong secret data, includes the following steps. Weak secret data, for example a password, is determined (320) for the user(110). The user authenticates (310) to servers (130), which include secret holding servers (preferably at least two secret holding servers). Each secret holding server has corresponding server secret data. A generating client (120), possibly assisted by the secret holding servers (130), computes (330, 530) the user's strong secret data. The strong secret data is a function of the user's weak secret data and of the server secret data. In a preferred embodiment, secret components are computed (534) for each secret holding server. Each secret component is a function of the weak secret data and of the strong secret data for that secret holding server. The secret components are combined (536) to generate the strong secret data. The generating client (120) also determines (350) verifier data for verification servers (130), preferably at least two. The verifier data enables a verification server (130) to verify (402,602) whether a device (220) has subsequently successfully recovered (400,600) the strong secret data. However, it is computationally infeasible for the server (130) to determine the weak secret data based only on access to its verifier data. The verification servers (130) may store (355) the verifier data for subsequent use. The generating client (120) may additionally use the strong secret data as a cryptographic key in a symmetric cryptosystem to encrypt (370) other private data for the user (110), such as the user's private key.

In a preferred embodiment, the strong secret data is computed (330,530) as follows. The generating client (120) computes server request data for at least one of the secret holding servers (130). The server request data is a function of the weak secret data and of an ephemeral client secret, but the server request data does not reveal information about the weak secret data without knowledge of the ephemeral client secret. As a result, the generating client (120) can transmit the server request data to the secret holding server (130) without compromising the weak secret data. The secret holding server (130) computes server response data, which is a function of the server secret data for the secret holding server and of the received server request data. The server response data does not reveal information about the server secret data without knowledge of the weak secret data and the ephemeral client secret. As a result, the secret holding server (130) can transmit the server response data to the generating client (120) without compromising its server secret data. The generating client (120) computes a secret component for the secret holding server as a function of the server response data received from the secret holding server and of the ephemeral client secret. The secret component is a function of the weak secret data and of the server secret data but is independent of the ephemeral client secret. The generating client (120) then computes the user's strong secret data as a function of the secret components.

In a further refinement, the weak secret data is a password PWD and the server secret data are random integers b(i), where i is an index for the servers (130). The generating client (120) computes (534) server request data which includes the value $M=w^a$. Here, w=f(weak secret data), where f is a function which generates an element of a group G, and the ephemeral client secret includes the random integer a for which there exists a corresponding integer a' such that $x^{aa'}=x$ for all x in the group G. The group G is a finite group in which exponentiation is efficient but the discrete logarithm problem is computationally infeasible, for example the multiplicative group of the set of integers modulo a prime p or a group of points on an elliptic curve over a finite field. All exponentiations are calculated in the group G. The secret holding server (130) computes (534) server response data which includes the value $c(i)=M^{b(i)}$. The generating client (120) then computes (534) secret components according to $K(i)=h(c(i)^{a'})$ wherein h is a function. The user's strong secret data is then computed (536) as a function of all the secret components K(i), for example as the exclusive-OR of these components, or as another example, the product of $c(i)^{a'}$ first in G.

In another aspect of the invention, the strong secret data is recovered (400,600) from the weak secret data as follows. A recovery client (220) receives (410) the user's weak secret data. The recovery client (220) then computes (440,640) the user's strong secret data, which is a function of the user's weak secret data and of server secret data for at least two secret holding servers (130). In a preferred embodiment, the computation is based on secret components, as described above. The recovery client (220) also determines (450,650) proof data for proving (460,660) that the strong secret data was successfully computed (401,601) and transmits (455,655) the proof data to verification servers (130), which may or may not also be secret holding servers. By validating the proof data using the corresponding verifier data, the verification servers (130) may determine (460,660) whether the strong secret data was successfully recovered (401,601) and take appropriate actions (680). For example, if it seems likely that an entity (220) which does not have access to the weak secret data is attempting to regenerate (401,601) the strong secret data, then the verification server might instruct the secret holding servers (130) to stop participating in any further recovery attempts (400,600). Alternately, the verification server might be responsible for generating part of a digital signature on behalf of user (110). In this case, the proof data might be accompanied by a message digest of a message to be signed and the verification server (130) will generate its part of the digital signature only when simultaneously presented with adequate proof data. If additional private data was encrypted (370) using the strong secret data as a cryptographic key, then the recovery client (220) may additionally decrypt (470) the private data.

In a preferred embodiment, the strong secret data is computed (440,640) as follows. The recovery client (220) computes (420,620) server request data for at least one and preferably more than one secret holding server. The server request data is a function of the weak secret data and of an ephemeral client secret, but it does not reveal significant information about the weak secret data without knowledge of the ephemeral client secret. The server request data is transmitted (425,625) to the secret holding server, which calculates (430,630) server response data based on the server request data and its server secret data. The server response data does not reveal significant information about the server secret data either with or without knowledge of the server request data. The server response data is transmitted (435,635) to the recovery client (220), which recovers (440,640) the user's strong secret data using the server response data.

In a preferred embodiment corresponding to the one described above, the recovery client (220) randomly generates (624) an ephemeral client secret a, which is an integer for which there exists a corresponding integer a' such that $x^{aa'}=x$ for all x in group G. It computes (626) server request data including the value $M=w^a$ where w=f(PWD) as above and transmits (625) this data to at least one secret holding server (130). Each secret holding server (130) computes (630) server response data including the value $c(i)=M^{b(i)}$ and transmits (635) this back to the recovery client (220). The recovery client (220) computes (644) the secret components $K(i)=h(c(i)^{a'})$ where h is the same function as above. The secret components are then combined (646), as in the generating client (120), to recover the strong secret data.

These methods (300,400,500,600) are advantageous because they allow a user (110) to recover (400,600) strong secret data from weak secret data at many recovery clients (220). The methods are generally resistant to attacks, including attacks on or compromise of the servers (130).

In general, in another aspect, a method for decrypting encrypted secrets using a first secret includes providing each of at least one servers with a respective server secret. The method also includes participating in a blind function evaluation protocol of a function by the at least one servers with a client which results in the generation of a strong secret by the client. The blind function takes as input client information derived from a first secret, and each respective server secret. The blind function evaluation protocol is designed such that the client cannot determine each of the respective server secrets and such that each server cannot determine the first secret and such that each server cannot determine either the respective strong secret component or the strong secret.

In one embodiment, the client obtains an encrypted secret, and derives a decryption key from the strong secret using a key derivation function. The client decrypts the encrypted secret using the decryption key. The client uses one of the decrypted secrets to verify the successful recovery of the strong secret. In one embodiment, the first secret is a PIN or password.

In one embodiment, the function for at least one of the servers is $h(w^{b(i)} \bmod n(i))$, where i is an index for each of the at least one servers, b(i) comprises the respective server secret for server i, w is the result of a mask generation function or hash function applied to the first secret, and h denotes a one-way function. In another embodiment, the function for at least one of the servers is $w^{b(i)} \bmod n(i)$, where i is an index for each of the at least one servers, b(i) comprises the respective server secret for server i, w is the result of a mask generation function or hash function applied to the first secret, and h denotes a one-way function.

In one embodiment, the the client information for at least one of the servers comprises $a(i)^{e(i)} w \mod n(i)$, where i is an index for each of the at least one servers, a(i) is an integer relatively prime to n(i), and w is the result of a mask generation function or a hash function applied to the first secret. In one embodiment, e(i) is a small integer that is relatively prime to LCM(p(i)−1, q(i)−1), where LCM stands for Least Common Multiple, and p(i) and q(i) are two primes whose product is the modulus n(i). In one such embodiment, the server secret b(i) for at least one server i is generated such that $b(i)=e(i)^{-1} \mod \text{LCM}(p(i)-1, q(i)-1)$. In another embodiment, in which multiple primes are used in the RSA cryptosystem, e(i) is a small integer that is relatively prime to LCM(p(i,j)−1 . . . p(i,J)−1), where LCM stands for Least Common Multiple, and {p(i, 1), p(i, 2) . . . p(i,J)} are J primes whose product is the modulus n(i).

In another embodiment, the strong secret components are combined to form the strong secret. In one embodiment, the method also includes verifying by at least one of the servers the successful recovery of the strong secret by the client. If K(i) denotes the strong secret component for each server i, and N denotes the number of servers, in one embodiment, the strong secret is combined as K(1)⊕K(2)⊕ . . . ⊕K(N), where ⊕ denotes the exclusive-OR operation In another embodiment, the strong secret comprises K(1)+K(2)+ . . . +K(N), wherein + denotes binary addition. In another embodiment, the strong secret comprises K(1)*K(2)* . . . *K(N), wherein * denotes binary multiplication, and in another embodiment, the strong secret comprises a combination of values using t-out-of-N threshold secret sharing, wherein the shares are encrypted using the strong secret component values. In one embodiment, one strong secret component is derived using a blind function evaluation protocol based on discrete logarithms, and at least one strong secret component is derived using a blind function evaluation protocol based on the problem of extracting roots modulo a composite.

In one embodiment, the function for at least one of the servers comprises h(w, b(i)), where i is an index for each of the at least one servers, b(i) comprises the respective server secret for server i, w is the result of a mask generation function or hash function applied to the first secret, and h denotes a one-way function. In one such embodiment, the blind function evaluation protocol comprises the server constructing a circuit and communicating the circuit to the client, and wherein the client evaluates the circuit at the first input of w. In one such embodiment, the blind function evaluation protocol includes the server constructing a circuit and communicating the circuit to the client, and the client evaluates the circuit for the first input w. In one such embodiment, the blind function evaluation protocol includes an oblivious transfer. In one such embodiment, the client cannot evaluate the circuit for more than one input.

In general, in another aspect, the invention relates to a system for decrypting encrypted secrets using a first secret. The system includes at least one servers each comprising a respective server secret and a blind function evaluator for participating in a blind function evaluation protocol with the client, the blind function evaluation protocol resulting in the generation of a strong secret revealed to the client but not the servers. The blind function takes as input client information derived from a first secret and each respective server secret. The function generates as output a strong secret component, the blind function evaluation protocol is designed such that the client cannot determine each of the respective server secrets and such that each server cannot determine the first secret and such that each server cannot determine either the respective strong secret component or the strong secret.

In one embodiment, the system also includes a data store storing an encrypted secret capable of being decrypted with a key derived from the strong secret, the data store accessible to the client over a communications network.

In one embodiment, the function for at least one of the servers is $h(w^{b(i)} \mod n(i))$, where i is an index for each of the at least one servers, b(i) comprises the respective server secret for server i, w is the result of a mask generation function or hash function applied to the first secret, and h denotes a one-way function. In another embodiment, the function for at least one of the servers is $w^{b(i)} \mod n(i)$, where i is an index for each of the at least one servers, b(i) comprises the respective server secret for server i, w is the result of a mask generation function or hash function applied to the first secret, and h denotes a one-way function.

In one embodiment, the the client information for at least one of the servers comprises $a(i)^{e(i)} w \mod n(i)$, where i is an index for each of the at least one servers, a(i) is an integer relatively prime to n(i), and w is the result of a mask generation function or a hash function applied to the first secret. In one embodiment, e(i) is a small integer that is relatively prime to LCM(p(i)−1, q(i)−1), where LCM stands for Least Common Multiple, and p(i) and q(i) are two primes whose product is the modulus n(i). In one such embodiment, the server secret b(i) for at least one server i is generated such that $b(i)=e(i)^{-1} \mod \text{LCM}(p(i)-1, q(i)-1)$. In another embodiment, in which multiple primes are used in the RSA cryptosystem, e(i) is a small integer that is relatively prime to LCMp(i,j)−1 . . . p(i,J)−1), where LCM stands for Least Common Multiple, and {p(i, 1), p(i,2) . . . p(i,J)} are J primes whose product is the modulus n(i).

In another embodiment, the strong secret components are combined to form the strong secret. In one such embodiment, the system also includes a verifier for verifying the successful recovery of a strong secret capable of being decrypted with a key derived from the strong secret. If K(i) denotes the strong secret component for each server i, and N denotes the number of servers, in one embodiment, the strong secret is combined as K(1)⊕K(2)⊕ . . . ⊕K(N), where ⊕ denotes the exclusive-OR operation In another embodiment, the strong secret comprises K(1)+K(2)+ . . . +K(N), wherein + denotes binary addition. In another embodiment, the strong secret comprises K(1)*K(2)* . . . *K(N), wherein * denotes binary multiplication, and in another embodiment, the strong secret comprises a combination of values using t-out-of-N threshold secret sharing, wherein the shares are encrypted using the strong secret component values. In one embodiment, one strong secret component is derived using a blind function evaluation protocol based on discrete logarithms, and at least one strong secret component is derived using a blind function evaluation protocol based on the problem of extracting roots modulo a composite.

In one embodiment, the function for at least one of the servers comprises h(w, b(i)), where i is an index for each of the at least one servers, b(i) comprises the respective server secret for server i, w is the result of a mask generation function or hash function applied to the first secret, and h denotes a one-way function. In one such embodiment, the blind function evaluation protocol comprises the server constructing a circuit and communicating the circuit to the client, and wherein the client evaluates the circuit at the first input of w. In one such embodiment, the blind function evaluation protocol includes the server constructing a circuit and communicating the circuit to the client, and the client evaluates the circuit for the first input w. In one such embodiment, the blind function evaluation includes an oblivious transfer. In one such embodiment, the client cannot evaluate the circuit for more than one input.

In general, in another aspect, the invention relates to a system for decrypting encrypted secrets using a first secret. The system includes a client in communication with at least one servers, the at least one servers each having a respective server secret. The servers have a blind function evaluator for participating in a blind function evaluation protocol with the client. The blind function evaluation protocol results in the generation of a strong secret component that is revealed to the client but not the servers. The blind function takes as input client information derived from a first secret and the respective server secret. The blind function evaluation protocol is designed such that the client cannot determine each of the respective server secrets and such that each server cannot determine the first secret, the strong secret component, or the strong secret. The client has a a receiver for receiving encrypted secrets, and a decryption function for decrypting the encrypted secrets with a key derived from the strong secret.

In further accordance with the invention, software and/or hardware (100,200) implements the above systems and methods.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
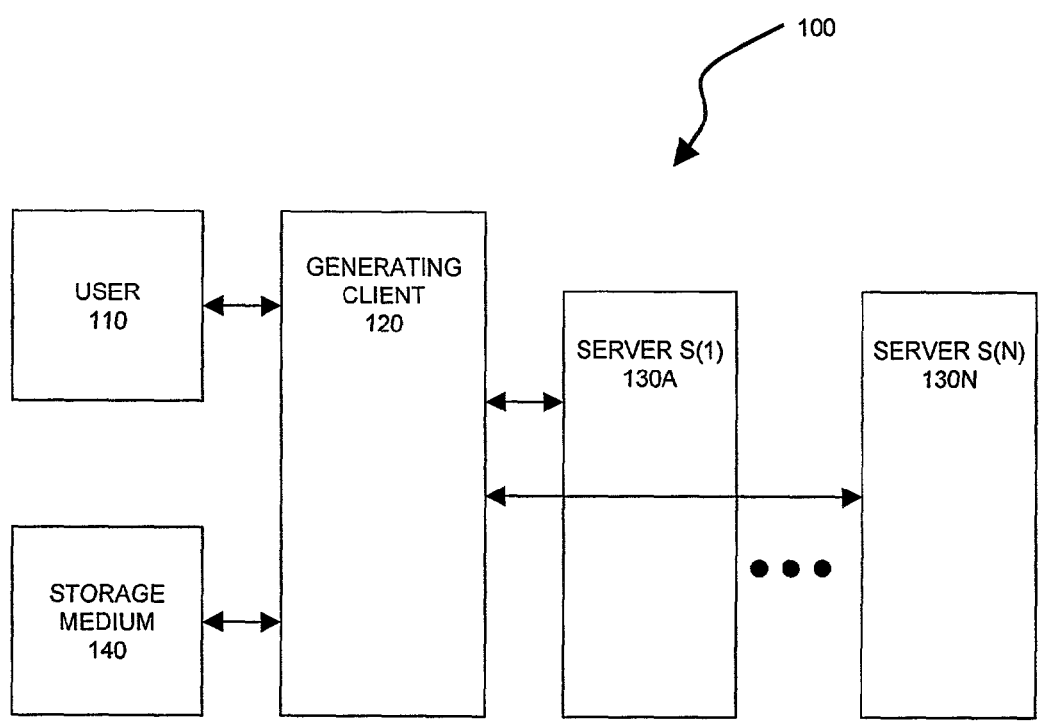
FIG. 1 is a block diagram of an initializing system (100) according to the present invention.
Figure 2:
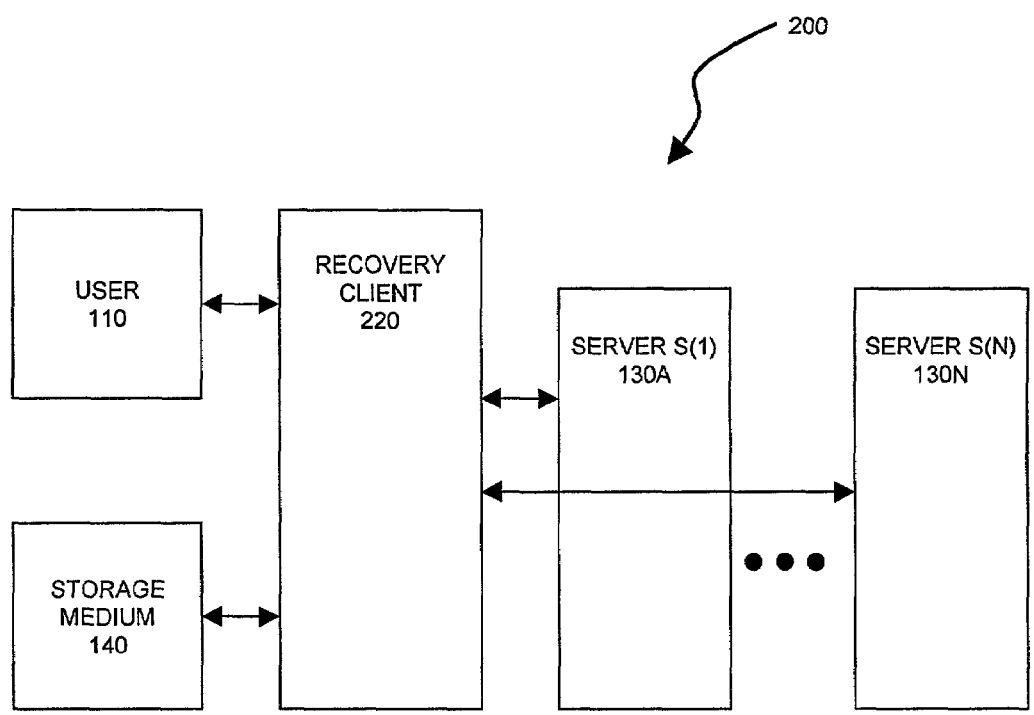
FIG. 2 is a block diagram of a recovery system (200) according to the present invention.

FIGS. 1 and 2 are block diagrams illustrating systems 100 and 200 in accordance with the present invention. For reasons which shall be apparent below, system 100 shall be referred to as an "initializing system" and system 200 as a "recovery system."

Initializing system 100 includes a user 110, a client terminal 120, a number of servers 130A-130N (collectively, servers 130) and optionally also a storage medium 140. The user 110 may be an individual, a group of individuals, a legal entity such as a corporation, a computer, or the like. Client terminal 120, which shall be referred to as the "generating client" 120, is typically some type of computer-based device. Examples include personal computers, computer workstations, personal digital assistants, and digital wireless phones. Servers 130 typically are also computer-based devices. In this description, they are referred to as "servers" because of the role that they play but this terminology is not meant to imply that they are necessarily server-class computers. At least one and possibly all servers 130 are secret holding servers. The role played by secret holding servers will be described more fully below. In certain embodiments, there may be a single server 130. Alternate embodiments prefer two or more secret holding servers 130. In embodiments which utilize multiple secret holding servers 130, the secret holding servers preferably are controlled by different entities so that no individual entity has access to all of the secret holding servers 130, for reasons discussed below. Examples of storage medium 140 include a network disk drive, a directory service, or a file server. The user 110, servers 130, and storage medium 140 are each coupled to the generating client 120. The connections may be made by any number of means, including over computer networks such as the Internet or by wireless connections. The connections need not be permanent or persistent. In fact, as will be described further below, generating client 120 performs a particular task and once that task is completed, there is no need for the other components to communicate further with generating client 120.

Recovery system 200 is similar to initializing system 100, except that generating client 120 is replaced by another client terminal 220, which shall be referred to as the recovery client 220. Recovery client 220 may or may not be the same physical device as generating client 120. Examples of recovery clients 220 include personal computers, digital kiosks, personal digital assistants, digital wireless phones or other wireless devices, and smartcards.

Systems 100 and 200 implement the following functionality. User 110 has strong secret data which he would like to be able to use from recovery client 220, where "strong" implies data that cannot feasibly be deduced by exhaustive guessing and "secret" means data that nobody other than the secret holder (e.g., the user in the case of the user's strong secret data) should feasibly be able to determine. However, recovery client 220 is a client terminal which cannot or does not have access to user 110's strong secret data a priori. Furthermore, user 110 does not directly know his strong secret data so, for example, user 110 cannot simply input his strong secret data into the recovery client 220. Hence, recovery client 220 must somehow regenerate or recover user 110's strong secret data and it must do so in a secure fashion in order to maintain the strong secrecy of the data. User 110 knows certain weak secret data, where "weak" implies that the data can be correctly guessed within a moderate number of tries. For example, it may be a user-specified password. User 110 enters his weak secret data into recovery client 220 and, based on user 110's weak secret data, system 200 then securely recovers the strong secret data, thus permitting user 110 to use his strong secret data from recovery client 220. System 100 and generating client 120 perform various initialization steps based on the strong secret data and the weak secret data, so that system 200 and recovery client 220 may later securely recover the strong secret data from the user 110's weak secret data. Servers 130 assist in these processes.

In a preferred embodiment, the strong secret data is a cryptographic key which is used in a symmetric cryptosystem to encrypt user 110's private data which might include a private key, and the weak secret data is a password. The encrypted private data are stored in storage medium 140. When user 110 desires to use his private data from recovery client 220, he supplies his password to recovery client 220. The recovery client 220 then recovers the cryptographic key which is used to decrypt the user's encrypted private data. User 110 can then use his private data as desired, for example, by using his private key to digitally sign messages within recovery client 220.

Figure 3:
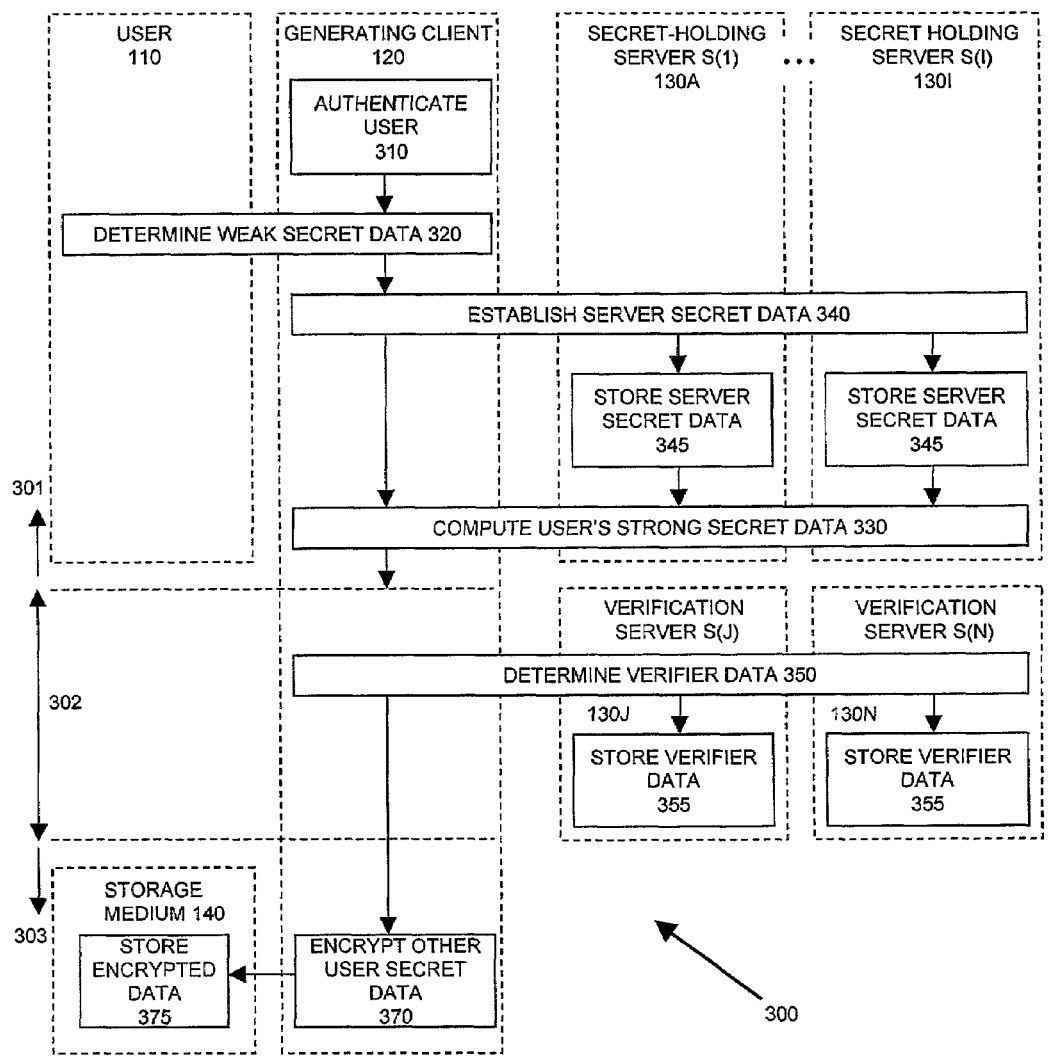
FIG. 3 is an event trace illustrating an example method (300) for initializing system 100, according to the present invention.
Figure 4:
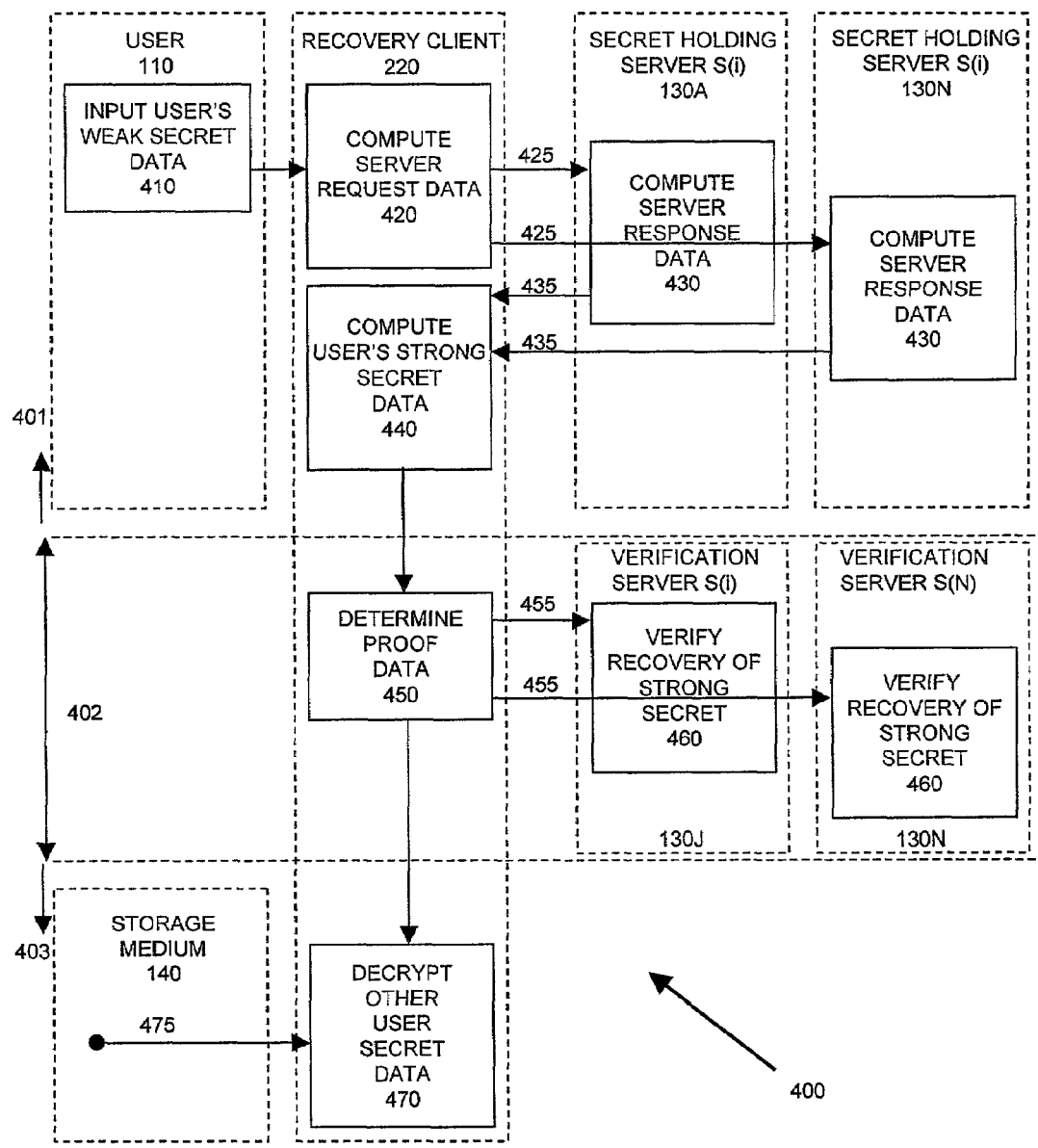
FIG. 4 is an event trace illustrating an example method (400) for recovering strong secret data which has been initialized using method 300.

FIGS. 3 and 4 are event traces which illustrate example methods 300 and 400 for performing initialization of system 100 and for recovering the strong secret data from user 110's weak secret data, respectively. Method 300 uses system 100 and method 400 uses system 200. Each of the dashed boxes 110, 120, 130, 140, and 220 represents one of the components of system 100 or system 200. The solid boxes represent various steps in the two methods 300 and 400. The location of a solid box within a dashed box generally indicates that that specific step is performed by that specific component. For example, in FIG. 4, step 310 is located within the dashed box for generating client 120. This generally indicates that generating client 120 performs step 310. The methods preferably are implemented by software running on the various components within each system, possibly assisted by hardware modules, but the processing modules depicted in FIGS. 3 and 4 can also be implemented in hardware and/or firmware.

Referring first to FIG. 3, initializing method 300 may be broken down into three general stages 301-303. In the generation stage 301, system 100 determines the user's strong secret data, which in this embodiment shall be referred to as K. This stage 301 includes steps which allow system 200 to later securely regenerate strong secret K. In the verifier setup stage 302, system 100 executes steps which allow system 200 to verify the subsequent successful recovery of strong secret K. In the storage stage 303, system 100 uses the strong secret K to encrypt private data for the user (e.g., the user's private key or digital certificate), for later recovery by recovery client 220. Not all implementations will utilize all stages 301-303, but they are included in this example to illustrate various aspects of the invention.

In the generation stage 301, the generating client 120 begins by authenticating 310 the user 110 as a legitimate user for user account U. This might involve communications with other systems, such as an authentication server.

The user 110 and/or generating client 120 determines 320 the user 110's weak secret data, referred to here as PWD. The weak secret is typically a user password in this embodiment, and this description will characterize it as such. However, the weak secret could take other forms and/or be wholly or partially from another source, such as biometric signature data and/or data stored in a physical token or device associated with the user 110. In FIG. 3, generation 320 of the weak secret is shown as covering both the user 110 and generating client 120. This is because either may participate to various degrees, depending on the specific implementation. For example, in one approach, the user 110 proposes a password PWD and the, generating client 120 either accepts or rejects the password, depending on whether it meets certain anti-guessing criteria. In a different approach, the generating client 120 generates the password PWD (for example, using a random process) and then assigns it to the user 110. In any event, at the end of step 320, both the user 110 and generating client 120 have access to the password PWD.

Server secret data b(i) for user 110 is established 340 for some and perhaps all of the servers S(i), where i is an index for the servers. The servers 130 for which server secret data is established are referred to as secret holding servers. Analogous to step 320, step 340 is shown as covering the generating client 120 and the secret holding servers S(i) because each may participate to various degrees, depending on the specific implementation, as will be described further below. If a specific implementation calls for the generating client 120 and secret holding servers S(i) to exchange messages in order to establish 340 the server secret data, it is important that these messages be integrity protected and the source of each message be authenticated in order to maintain the security of the overall protocol. For example, the generating client and secret holding servers S(i) might exchange messages over a secure channel. At the end of step 340, each secret holding server S(i) has access to its corresponding server secret data b(i) and typically will also securely store 345 it for future use in recovering the user's strong secret data. The generating client 120 may also have access to the server secret data b(i), depending on the specific implementation. However, in this case, it typically would use the server secret data b(i) only as part of the initialization 300 and then would erase it. The generating client 120 does not retain the server secret data b(i) for future use.

The generating client 120 computes 330 the user's strong secret data K The strong secret data K is a function of the user's weak secret PWD and of the server secret data b(i). Again, step 330 covers both the generating client 120 and the servers S(i) because, depending on the implementation, each may contribute to the calculation required to convert the user's weak secret PWD and the server secret data b(i) into the strong secret K. However, although the secret holding servers S(i) may calculate intermediate values, only the generating client 120 has access to the final strong secret K.

In the verifier setup stage 302, verifier data v(i) is determined 350 for some and perhaps all of the servers S(i) and preferably is also stored 355 by each server S(i). The servers for which verifier data is established shall be referred to as verification servers 130. The verifier data v(i) enables the verification servers S(i) to verify whether a recovery client 220 has successfully recovered the user's strong secret data. In a preferred embodiment, the secret holding servers are also the verification servers, although this is not necessarily the case. Alternately, the verification servers may be physically distinct from the secret holding servers, but there may be one verification server corresponding to each secret holding server. For redundancy purposes, it is preferable to have at least two verification servers. The verifier data is selected such that it is computationally infeasible for the verification server to determine the weak secret data based only on access to its verifier data. In one approach, the generating client 120 determines 350 the verifier data, which is then transmitted to server 130. In an alternate approach, each server 130 determines its own verifier data. Analogous to step 340, if a specific implementation calls for the generating client 120 and server 130 to exchange messages in order to determine 350 the verifier data, it is important that these messages be integrity protected and the source of each message be authenticated.

In the storage stage 303, the generating client 120 additionally encrypts 370 other data for the user, which shall be referred to as the user's private data. In a preferred embodiment, the strong secret data K is used as a cryptographic key in a symmetric cryptosystem. For example, the private data could be the user's private key, a secret shared by the user and an application server, the user's credit card account numbers or other private or secret data which the user would like to use from the recovery client 220. The encrypted private data EPD is stored 375 in storage medium 140 for later recovery. Storage medium 140 typically is widely accessible; the user's private data is secured because it is stored in encrypted form. In alternate embodiments, the strong secret data K may be used in other ways to securely store the user's private data.

Referring now to FIG. 4, the recovery method 400 may also be broken down into three general stages 401-403 corresponding to stages 301-303 of method 300, not all of which are required in all implementations. In stage 401, the recovery client 220 recovers the user's strong secret K, with the assistance of the secret holding servers 130. In stage 402, one or more verification servers 130 determine whether the recovery client 220 has successfully recovered the strong secret data K. In stage 403, the recovery client 220 also recovers the user's private data stored in storage medium 140. Again, the example method 400 is selected in order to illustrate various aspects of the invention, not all of which are required to practice the invention.

The recovery client 220 recovers 401 the user 110's strong secret data as follows. The user 110 inputs 410 his user account identifier U and weak secret data PWD to the recovery client 220. The recovery client 220 computes 420 server request data for each of the secret holding servers S(i) and transmits 425 the server request data to the secret holding servers. The server request data is a function of the weak secret data PWD and an ephemeral client secret a, such that the output of the function does not reveal information about the weak secret to a party that does not know the ephemeral client secret a. In response to the received server request data, each secret holding server S(i) computes 430 server response data, which is a function of the server request data and of the server's secret data b(i), and transmits 435 the server response data back to the recovery client 220. The recovery client 220 then computes 440 the user's strong secret data K as a function of the received server response data. As described previously, the strong secret data is a function of the user's weak secret data and of the server secret data. The recovery client 220 has direct access to the user's weak secret data but does not have direct access to the server secret data. However, the server response data contains a dependency on the server secret data; so the recovery client 220 has indirect access to the server secret data and can recover the user's strong secret data without requiring direct access to the server secret data.

In recovery stage 403, recovery client 220 retrieves 475 the user's encrypted private data EPD and decrypts 470 it using the recovered strong secret data K. In this way, recovery client 220 also recovers the user's private data, such as the user's private key.

At the end of the period of legitimate use of strong secret K and any other recovered private data (e.g., at the end of the user's on-line session using the recovery client 220), the copy of K and the other recovered private data in the recovery client 220 preferably are destroyed.

In the verification stage 402, the recovery client 220 determines 450 proof data d(i) for proving to at least one verification server (preferably to at least two one verification servers) that the strong secret data was successfully recovered by the recovery client 220. The proof data d(i) is transmitted 455 to each of the verification servers. Each verification server can then verify 460 whether this particular instantiation of the regeneration process 400 successfully recovered the user's strong secret data K and can take appropriate actions. For example, in one embodiment, a verification server 130 might be responsible for a portion of the process of generating a digital signature on behalf of the user 110. In this case, the proof data may be accompanied by a message digest of the user-originated message to be digitally signed. Upon verification of the proof data, the verification server 130 generates its component of the digital signature and transmits this back to the client. The client determines the full digital signature based on the components which it receives.

As another example, the verification server may also be a secret holding server. This server might determine, based on the history of past unsuccessful attempts, that an entity which does not know the weak secret data is attempting to regenerate the strong secret data.

Accordingly, the secret holding server may refuse to participate in recovery attempts or take other actions. In one approach, the secret holding servers keep track of all attempts to regenerate the strong secret data K for each user account and, in the event of excessive failed attempts for any account will throttle and/or lock out further regeneration attempts on that account until either the password is changed or a local administrator determines that the failed attempts do not represent a threat to the account.

Different types of verification may be used. In one approach which uses static verifier data, the verifier data v(i) is a one-way function of one or more data items that include the strong secret data K. The verifier data is computed by the generating client 120 or some other trusted party and is sent to and stored at each verification server as part of the initializing process 300. Preferably, different verifier data is computed for each verification server 130, for example, by applying a hash function to a data string comprising the strong secret data K concatenated with a unique but non-secret identifier for the particular server 130. In verification stage 402, the recovery client 220 computes 450 the proof data by recomputing the same one-way function of the regenerated strong secret data. If the proof data computed by the recovery client 220 matches the verifier data stored by the server, then recovery of the strong secret data is verified.

In one variant of this approach, the recovery client 220 first recomputes verifier data as a one-way function of the strong secret K then computes the proof data as a one way function of one or more data items that include the recomputed verifier data and a non-secret nonce, such as a timestamp or a nonce sent previously from the server to the recovery client either along with the server response data (e.g., in the case of a secret holding server) or in a separate message. The verification server 130 computes its own proof data by applying the same one-way function to its copy of the verifier data and the nonce. If the proof data computed by the recovery client 220 matches the proof data computed by the verification server 130, then recovery of the strong secret data is verified. The nonce allows the server to confirm that the proof data is fresh and is not a replay of earlier proof data for the same user. In other words, the nonce distinguishes the current proof data from other instances of proof data for the same user.

In a different verification approach, assume that the user's private data stored in storage medium 140 includes private data (e.g., a private key) of an asymmetric proof system, for which there exists corresponding public data. The asymmetric proof system has the property that an entity which has access to the private data can prove it has access to the private data to a second entity with access to the public data without disclosing the private data to the second entity. The asymmetric proof system could be a digital signature system, such as RSA cryptosystem-based digital signatures, a zero-knowledge proof system whereby possession of information can be verified without any part of that information being revealed, or another type of asymmetric proof system. For the purposes of describing the invention, a digital signature system will be assumed. In this case, the recovery client 220 may generate proof data which depends on the decrypted private data, thus proving successful recovery of the private data and, hence, also successful recovery of the strong secret data (since the strong secret data is required to successfully decrypt the private data).

For example, if the private data is the user's private digital signature key, the proof data could comprise a message, preferably containing a nonce to allow detection of replays, which was digitally signed using the private key. If the verifier data is the corresponding public key, it could then be used to verify successful recovery of the private key. Verifying 460 successful recovery of the strong secret data would then include verifying that the private key was used to digitally sign the message. If a nonce is used, then verifying the freshness of the proof data would involve verifying that the digitally signed message contains the nonce. As an alternative, the proof data may be a function of other user data which the verification server can authenticate as originating from the user. Other variations of the verification step may be based on other approaches, for example using zero-knowledge proofs (e.g., see J. Nechvatal, "Public Key Cryptography," in G. J. Simmons (Ed.), *Contemporary Cryptology: The Science of Information Integrity* (New York: IEEE Press, 1992), pp. 107-126).

Other variations of methods 300 and 400 will be apparent. However, in order to maintain resistance against attacks, including compromise of the servers, any successful protocol preferably should include the following attributes. First, observation of any or all messages by an eavesdropper cannot yield sufficient information for the eavesdropper to feasibly deduce either the weak secret data PWD or the strong secret data K. Second, knowledge of anything less than all of the server secret data from a predetermined number of secret holding servers will not permit any party to feasibly deduce either the weak secret data PWD or the strong secret data K. "Any party" includes the servers themselves. That is, a server cannot feasibly deduce either weak secret data PWD or the strong secret data K unless a predetermined number of secret holding servers collude by either disclosing their server secret data or by failing to throttle or lock out the account in the event of excessive failed attempts at executing the protocol. As a result, methods 300 and 400 are advantageous because they are resistant to many types of attacks, including compromise of a server, when the strong secret data depends on server secret data of at least two secret holding servers.

Figure 5:
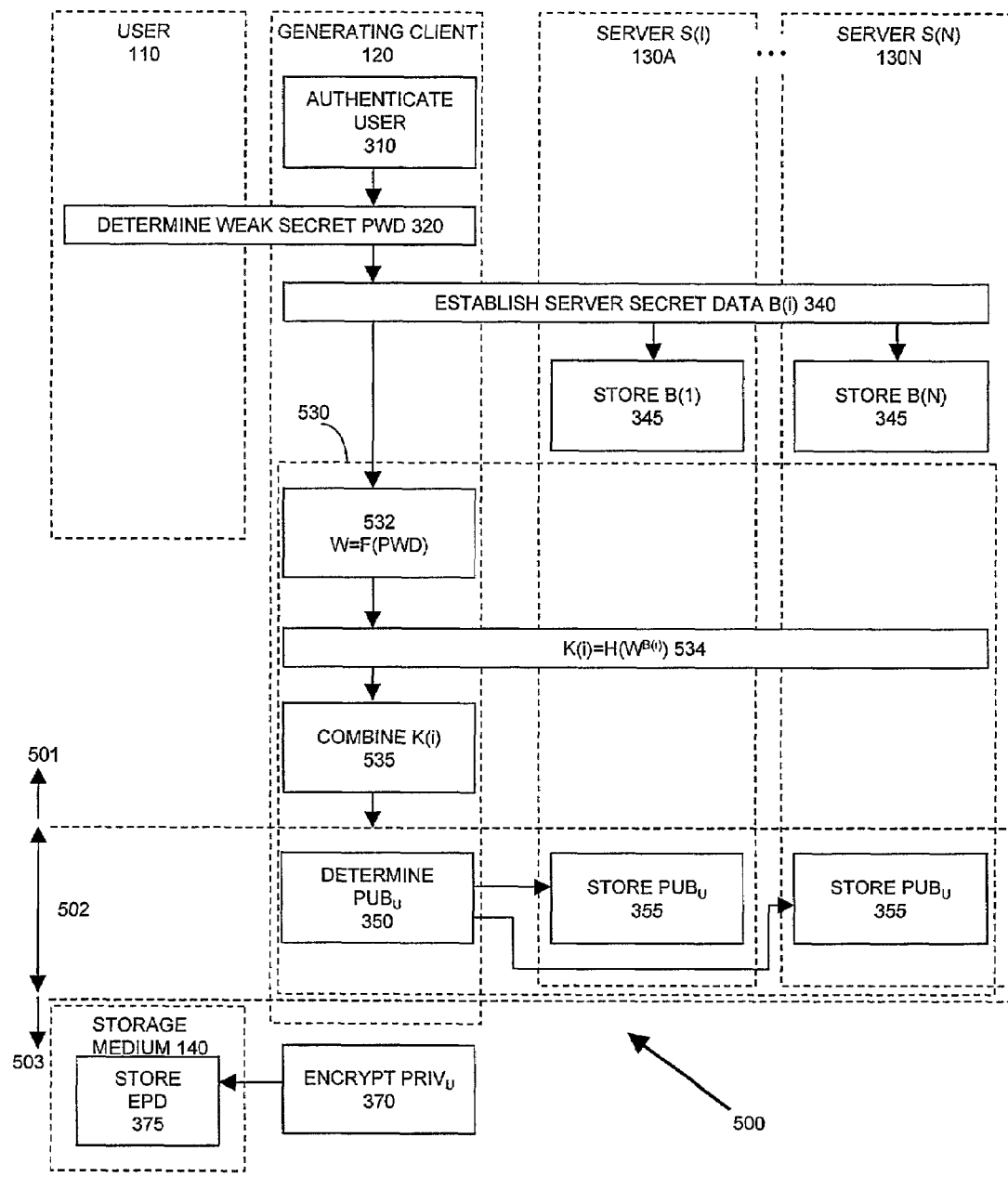
FIG. 5 is an event trace illustrating a preferred method (500) for initializing system 100 using exponentiation in a group G, according to the present invention.
Figure 6:
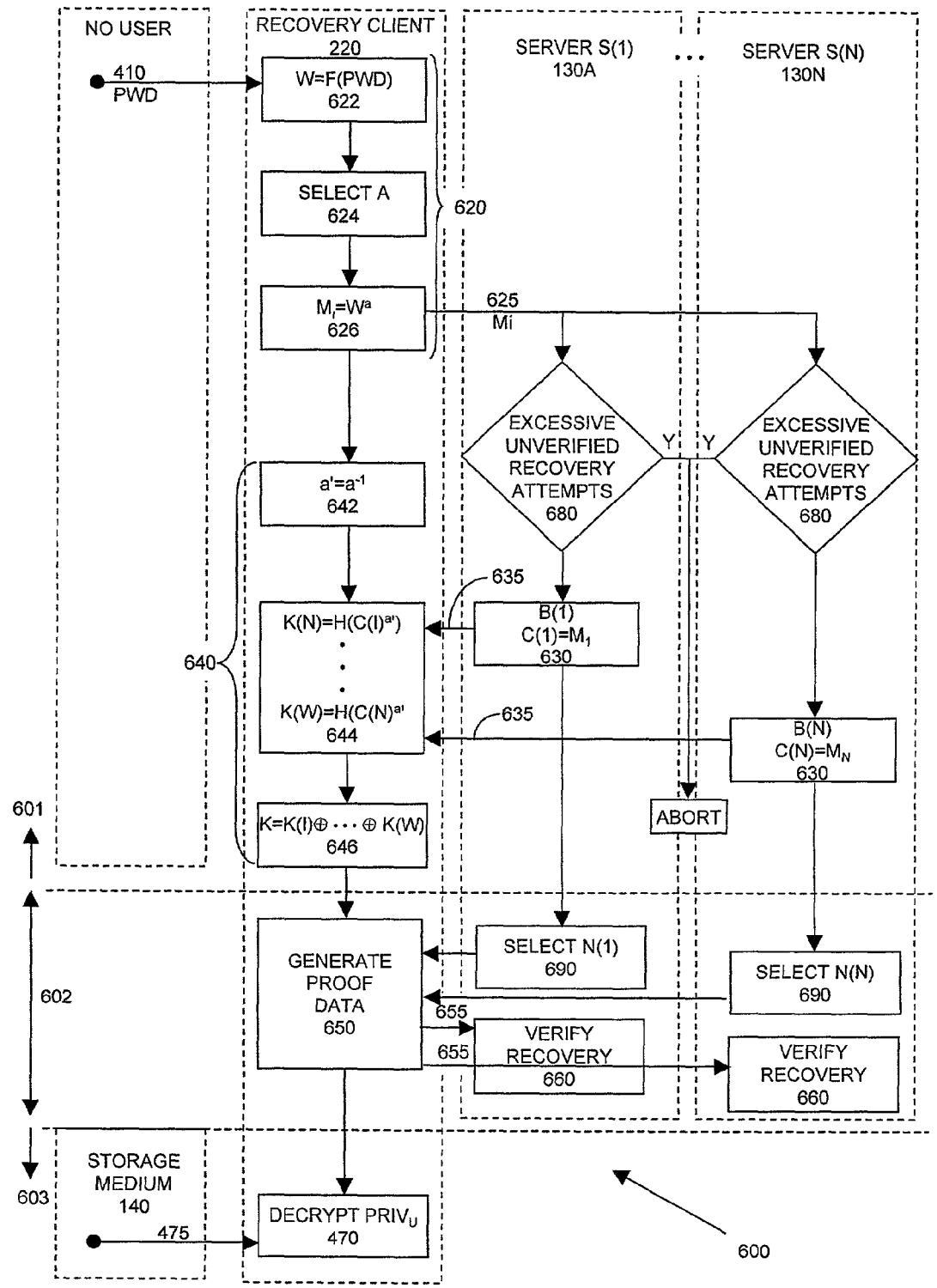
FIG. 6 is an event trace illustrating a preferred method (600) for recovering strong secret data which has been initialized using method 500.

FIGS. 5 and 6 are event traces which illustrate preferred embodiments 500 and 600 of methods 300 and 400, respectively. The preferred embodiments are based on computations within a finite group G in which exponentiation is efficient but the discrete logarithm problem is computationally infeasible. A suitable group G is the multiplicative group of the set of integers modulo a prime p, where p is a large prime with properties that make it suitable as a Diffie-Hellman modulus. In particular, at a minimum, $p-1$ must have a large prime factor. A better restriction on p is that it be a safe prime $p=2q+1$, where q is prime. Other cyclic groups are also suitable, including a group of points on an elliptic curve over a finite field. The methods will be illustrated in the context where the strong secret data K is subsequently used as a cryptographic key used to encrypt the user's private key but, as discussed previously with methods 300 and 400, preferred methods 500 and 600 also are not limited to this particular application. In this particular example, each server 130 functions as both a secret holding server and as a verification server.

Referring first to FIG. 5, initializing method 500 may be broken down into the three general stages 501-503, analogous to stages 301-303 of method 300. The generation stage 501 begins the same as generation stage 301. The generating client 120 authenticates 310 the user as a legitimate user for account U. Next, the user's weak secret data PWD is determined 320.

Server secret data b(i) for user 110 is established 340 for each secret holding server S(i), where i is an index for the servers 130. In this embodiment the server secret data is a random integer b(i), preferably an even number to prevent against small subgroup attacks that are well known in Diffie-Hellman methods. At the end of step 340, each secret holding server has access to its server secret data b(i); the generating client 120 may or may not have access to the server secret data b(i), depending on the specific implementation. In one approach in which both a secret holding server S(i) and the generating client 120 have access to that server's server secret data b(i), the server secret data b(i) is generated by either the generating client 120 or by the server S(i) and communicated to the other party in an encrypted form. Alternately, the server secret data is computed by combining random values from both the generating client 120 and secret holding server S(i), for example, by Diffie-Hellman key exchange. Communications preferably are protected such that no other party can learn b(i). On the other hand, if the generating client 120 does not have access to the server secret data b(i), then each secret holding server S(i) might generate its server secret data b(i) but does not share it with the generating client 120 or the other servers S(i). Whatever the generation method, each server typically will securely store 345 its server secret data for future use in regenerating the user's strong secret data.

Once the generating client 120 has computed 534 the secret components K(i), it then computes 536 the strong secret K as a function of the secret-components K(i) of the participating secret holding servers S(i). In this example, the strong secret K is calculated 536 according to a bit-wise exclusive-OR, $K=K(1) \oplus K(2) \oplus \ldots \oplus K(N)$ where $\oplus$ denotes exclusive-OR. Binary addition and t-out-of-N threshold secret sharing methods are two other methods for combining the secret components K(i). In a t-out-of N threshold secret sharing method, there are N secret holding servers but the strong secret data can be computed from recovery data from only t of them, where t is less than N. A t-out-of-N secret sharing scheme is described, for example, in A. Shamir, "How to Share a Secret," Communications of the ACM, 22 (1979), pp. 612-613. A secret is split into N shares such that the secret can be reconstructed from every combination of t shares, but not from any combination of t−1 shares. Other methods can also be used, for example binary addition and multiplication.

It is also possible to obtain a threshold scheme in the RSA cryptosystem-based case by having the servers perform a distributed computation with a common modulus (see, e.g., D. Boneh and M. Franklin. "Efficient Generation of Shared RSA Keys." Proceedings of Crypto '97, pages 425-439.) The client sends a single value $a^e$ w mod n to all the servers, which would share a modulus n. This value would be exponentiated to the $b^{th}$ power by the distributed computation involving a threshold number of servers to produce ($a^e$ w) b mod n=a $w^b$ mod n, and the value $w^b$ mod n would be recovered by multiplying by $a^{-1}$ mod n as previously.

Effectively, the scheme amounts to a blind, distributed computation according to the RSA cryptosystem: the servers can jointly exponentiate to the $b^{th}$ power without any individual server knowing b. Proactive variants may also be applicable where the servers update their shares periodically while maintaining the ability to jointly exponentiate to the same $b^{th}$ power. Distributed computations may also be applied in the discrete logarithm case, where an exponent b is shared among multiple servers and the value $w^b$ mod p is determined jointly. See, e.g., A. Herzberg, S. Jarecki, H. Krawczyk, and M. Yung, "Proactive Secret Sharing, or: How to Cope with Perpetual Leakage," in Proceedings of Crypto '95, pp. 339-352.

For example, if the generating client 120 has direct knowledge of the server secret data b(i), then it can directly compute 534 the secret components $K(i)=h(w^{b(i)})$. Alternately, if the generating client 120 does not have access to the server secret data b(i), then the following protected transaction method may be used. The generating client 120 selects a client ephemeral secret which is a random integer a for which there exists a corresponding integer a' such that $x^{aa'}=x$ for all x in group G. For example, if G is the group of integers modulo p, a may be selected to be an element of the multiplicative group of integers modulo p−1 and a' would then be its multiplicative inverse. The generating client computes and sends a message $M_1=w^a$ to each secret holding server S(i). Secret holding server S(i) computes c(i) $=M^{1b(i)})$ and sends c(i) to the generating client 120. The generating client 120 computes the value a' corresponding to a and then computes 534 the secret component $K(i)=h(c(i)^{a'})=h(w^{b(i)})$. This approach ensures that no secret data is exposed to an eavesdropper, by making use of the encrypting properties of discrete exponentiation.

Once the generating client 120 has computed 534 the secret components K(i), it then computes 536 the strong secret K as a function of the secret-components K(i) of the participating secret holding servers S(i). In this example, the strong secret K is calculated 536 according to a bit-wise exclusive-OR, $K=K(1)\oplus K(2)\oplus \ldots \oplus K(N)$ where $\oplus$ denotes exclusive-OR. Binary addition and t-out-of-N threshold secret sharing methods are two other methods for combining the secret components K(i). In a t-out-of N threshold secret sharing method, there are N secret holding servers but the strong secret data can be computed from recovery data from only t of them, where t is less than N. Other methods will be apparent.

In the storage stage 503, the strong secret data K is used as a cryptographic key in a symmetric cryptosystem to encrypt 370 a user's private data including a private key $Priv_U$. The encrypted private data, denoted by EPD, which includes the encrypted private key, denoted by $E_K(Priv_U)$, where $E_K$ means encrypted with key K, is stored 375 in storage medium 140.

In the verifier setup stage 502, the public key, $Pub_U$, corresponding to the user's private key, $Priv_U$, might be used as the verifier data v(i). In this embodiment, each secret holding server also plays the role of a verification server S(i) and stores 355 its verifier data $v(i)=Pub_U$ or at least has access to the public key. In an alternate approach, the verifier data v(i)=h(K, Id(i)), where Id(i) is a unique but publicly known identifier for server S(i) and h is a one-way function such as a hash function. The inclusion of Id(i) ensures that different verifier data is produced for each verification server.

Referring now to FIG. 6, the recovery process 600 also includes three stages 601-603. In stage 601, the recovery client 220 recovers the user's strong secret K based on his weak secret PWD, with the assistance of the secret holding servers. In the verification stage 602, the recovery client 220 proves to the verification servers that it has successfully recovered the strong secret K. In stage 603, the recovery client 220 recovers the user's private key, $Priv_U$.

Recovery 601 of the strong secret K begins with the recovery client 220 receiving 410 the user account identifier U and password PWD from the user 110. The recovery client 220 then regenerates the required secret components K(i) using the protected transaction method described above. In particular, the recovery client 220 computes 622 w=f(PWD), where f is the same one-way function used in the generation stage 500. The recovery client 220 selects 624 an ephemeral client secret which is a random integer a for which there exists a corresponding integer a' such that $x^{aa'}=x$ for all x in group G. For example, if G is the group of integers modulo p, a may be selected to be an element of the multiplicative group of integers modulo p−1 and a' would then be its multiplicative inverse. The recovery client then computes 626 the server request data $M_1=w^a$ and transmits 625 this server request data to server S(i). Note that the server request data $M_1$ is a function of both the weak secret data PWD and of the ephemeral client secret a. However, the server request data $M_1$ does not reveal information about the weak secret data PWD without knowledge of the ephemeral client secret a.

Server S(i) receives the server request data $M_1$. The server increments a counter of unverified recovery attempts for user account U and the current password PWD and determines 680 whether it is likely that a party without access to the password is attempting to regenerate the strong secret data. In this embodiment, it does so by determining whether the number of unverified recovery attempts exceeds a threshold. If it does, then the server disables the user account U and aborts the recovery process 600. Depending on the properties of the group G, the server may also verify that server request data $M_1$ satisfies necessary strength properties. If the server request data $M_1$ does not have the requisite strength properties, then the server aborts the recovery process. If the recovery process has not been aborted, the server computes 630 the server response data $c(i)=M^{1b(i)}=w^{ab(i)}$ and sends 635 c(i) to the recovery client 220. The server also generates 690 a unique index N(i), or nonce, for this instantiation of the recovery process and transmits the nonce to the recovery client 220. The server sets a state variable indicating verification pending for nonce N(i). In a preferred approach, the server transmits to the recovery client 220 a single message, which is based on both the server response data c(i) and the nonce N(i). Similar to the server request data $M_1$, the server response data c(i) is a function of the server secret data b(i) for the secret holding server and of the server request data $M_1$ received. However, the server response data c(i) does not reveal information about the server secret data b(i) without knowledge of the server request data $M_1$, or somewhat equivalently, of the weak secret data PWD and ephemeral client secret a.

Upon receipt of the message from the server, the recovery client 220 may abort the recovery process 600 if the received message does not have the requisite strength. Otherwise, the recovery client 220 computes 642 the value a' that corresponds to a It then computes 644 the secret component $K(i)=h(c(i)^{a'})=h(w^{b(i)})$. Note that use of the ephemeral client secret a makes the communications between recovery client 220 and secret holding server 130 resistant to attacks intended to deduce the weak secret data PWD or server secret data b(i). However, the secret component K(i) is a function of both the weak secret data PWD and server secret data b(i), but is independent of the ephemeral client secret a. Finally, the recovery client 220 computes 646 the strong secret data K=K(1)⊕K(2)⊕ . . . ⊕K(N). The recovery client 220 can then recover the user's private key $Priv_U$ by retrieving 475 and decrypting 470 EPD using the recovered cryptographic key K.

As mentioned previously, different verification approaches may be used. For example, assume that the user's public key $Pub_U$ is used as the verifier data v(i). Then, the recovery client 220 can generate 650 proof data by digitally signing a message containing the various nonces N(i) using the user's recovered private key $Priv_U$. Each verification server verifies 660 successful recovery of the strong secret data K by verifying the digital signature using the user's public key $Pub_U$, and then verifying that the correct nonce N(i) is included in the message. On the other hand, assume that the verifier data v(i)=h(K, Id(i)). Then, the proof data can be computed according to the expression g(v(i), n(i)) where g is a one-way function such as a cryptographic hash function. The verification server verifies 660 the proof data by computing its own value from its own knowledge of v(i) and n(i), and comparing the result with the value received.

Upon receipt of the proof data, each server determines whether the state variable indicates verification pending for nonce N(i). If verification is pending, then the server verifies that the received proof data successfully demonstrates knowledge of strong secret K and freshness linked to nonce N(i). If both of these are verified, then the counter of unverified recovery attempts for user account U and password PWD are decremented. Otherwise, the recovery process is considered to be unsuccessful.

The manner in which the K(i) values are computed in the embodiments 500 and 600 of the methods 300 and 400 is an example of a blind function evaluation protocol, where the client 120, 220 and each of the servers S(i) compute a function without revealing its inputs to each other, and only the client 120, 220 knows the result. In the embodiments 500 and 600, the function is $K(i)=h(w^{b(i)})$ in the group G, where b(i) is the server's S(i) secret input and w is the client's 120, 220 secret input.

This approach can be generalized where the blind function evaluation protocol is represented mathematically by the expression $K(i)=g(w, b_i)$. The function g is constructed such that neither the client 120, 220 nor the servers S(i) can determine the other's inputs, yet the same inputs consistently produce the same output K(i). Preferably, the protocol is designed such that a third party does not learn any of the three values w, $b_i$, and K(i).

Various blind function evaluation protocols have been developed that are based on different functions. These include, as examples not intended to be limiting, implementations based on discrete-logarithm cryptography and the RSA cryptosystem, which is based on the problem of extracting roots modulo a composite. Blind function evaluation is an instance of multi-party secure computation, introduced by A. Yao in "Protocols for Secure Computations," IEEE FOCS (1982), pp. 160-164. In multi-party secure computation, a function is computed in which the inputs are provided by two or more parties, and the output may be kept private from some parties as well. It has been shown that any polynomial-time computable function g can be computed securely in polynomial time by representing the function as a logic circuit and evaluating it with what amounts to a gate-by-gate protocol (which tends to be complex).

In the embodiments 500, 600 using discrete logarithm cryptography and the embodiments 700, 800 based on the RSA cryptosystem, the function g has a special form and the protocol is more efficient, but it is also possible to use another one-way function, for example a hash function, or an encryption function, and apply the general methods. Generally, the function $g(w, b_i)$ should be one-way with respect to $b_i$ such that it is difficult to determine $b_i$, given a set of $g(w, b_i)$ values for some inputs w. Otherwise, an attacker could participate in the protocol some number of times, each time providing different values of w, and then solve for $b_i$. Also, it should be difficult, given a set of $g(w, b_i)$ values and some inputs w, to determine $g(w, b_i)$ for other values of w. Otherwise, an attacker could use the results of some password guesses to get the result of other password guesses. The second property implies the first.

Yao's construction enables two parties, such as the server and the client in this implementation, to compute the output y of any polynomial-computable function f on any pair of secret inputs $b_i$ and w in the domain off in such a way that the evaluator learns y, and neither party learns any additional information. Other variants are also possible.

Assuming that the server behaves correctly, i.e., adheres to the protocol, but may try to learn additional information, the Yao construction involves two phases. In the first phase, the server decides on a polynomial-sized boolean circuit C. Input to this circuit is a secret v, while the output is $g(v, b_i)$. If $v_1, v_2, \ldots, v_n$ represent the individual bits of v, the circuit C is constructed in such a way that each bit $v_i$ is expressed as one of two random "tags", $y_i^0$ and $y_i^1$, the first assigning a '0' bit to $v_i$ and the second assigning a '1' bit to $v_i$. The server sends C (in an appropriate representation) to the user. Further details are available in the Yao paper.

In order to evaluate C on the desired secret value $w=w_1, w_2 \ldots w_n$, the user must obtain the correct set of tags $\{y_i^{wi}\}$. On the other hand, to ensure in general that the user learns no information other than y, it is critical that the user learn only these tags, and furthermore that the server not learn which tags the evaluator has obtained. This is accomplished by means of a protocol known as one-out-of-two oblivious transfer, abbreviated 1-2 OT. 1-2 OT is a cryptographic primitive involving two players, a sender and a receiver. The sender sends two values $x_0$ and $x_1$ to the receiver. The receiver selects a bit c and receives $x_c$. The sender learns no information about c, while the receiver learns no information about $x_{1-c}$. Yao proposed an RSA-based 1-2 OT protocol in the paper referenced above, while Goldreich, Micali, and Wigderson extended the protocol to make use of any one-way permutation.

In the second phase, the server sends the set of tags $\{y_i^{wi}\}$ to the user using a 1-2 OT protocol as follows. For each value i, the server sets $x_0=y_i^0$ and $x_1=y_{i1}$, and the user selects $z=w_i$. Once the second phase is complete, the user has all of the necessary tags to compute $g(w, b_i)$.

Although the server does not learn and and an attacker does not have access to the output K(i) of the function g, it may be possible for an attacker to determine whether the output K(i) has been correctly computed (e.g., by observing whether the user successfully uses the strong secrets). In such a case, the protocol should include additional protection as described in Christian Cachin and Jan Camenisch, "Optimistic Fair Secure Computation," Proceedings of Crypto 2000, pages 93-111, and Moni Naor, Benny Pinkas, Reuban Sumner, "Privacy Preserving Auctions and Mechanism Design", ACM Conference on Electronic Commerce, 1999, pages 129-139 to assure the user that the server has correctly constructed the circuit C. Otherwise, an opponent who compromises the server might provide a circuit C' for evaluating an alternative g' that produces the same output as the function g if one of the input bits, say $v_i$, has a certain value, and a random output otherwise. By observing whether the user obtains the correct output given the alternative circuit, the opponent can determine the value of the input bit $w_i$, and by repeating this process, can solve for all of w.

Figure 7:
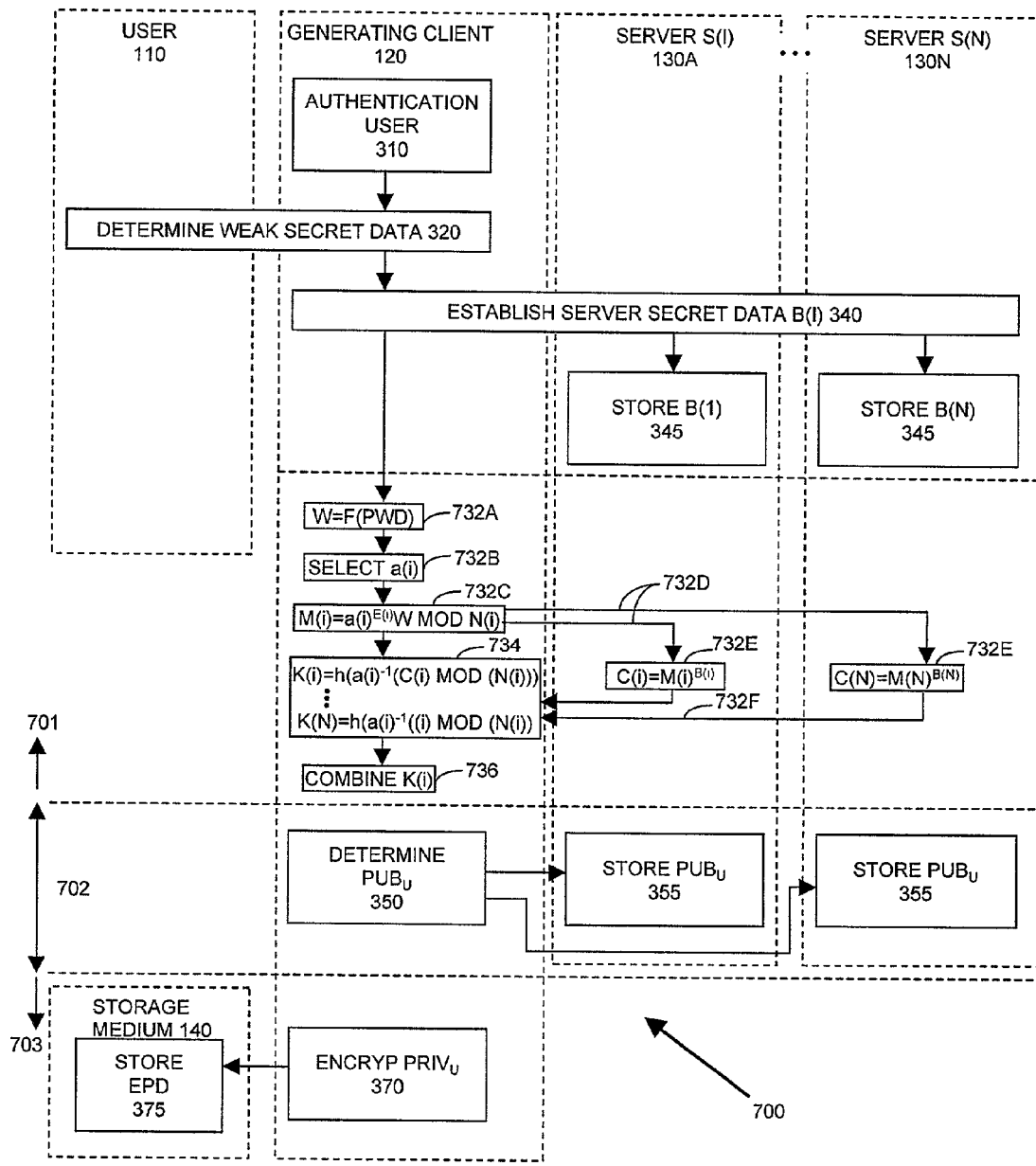
FIG. 7 is an event trace illustrating a method (700) for initializing system 100 employing a blind function evaluation protocol based on the RSA cryptosystem.
Figure 8:
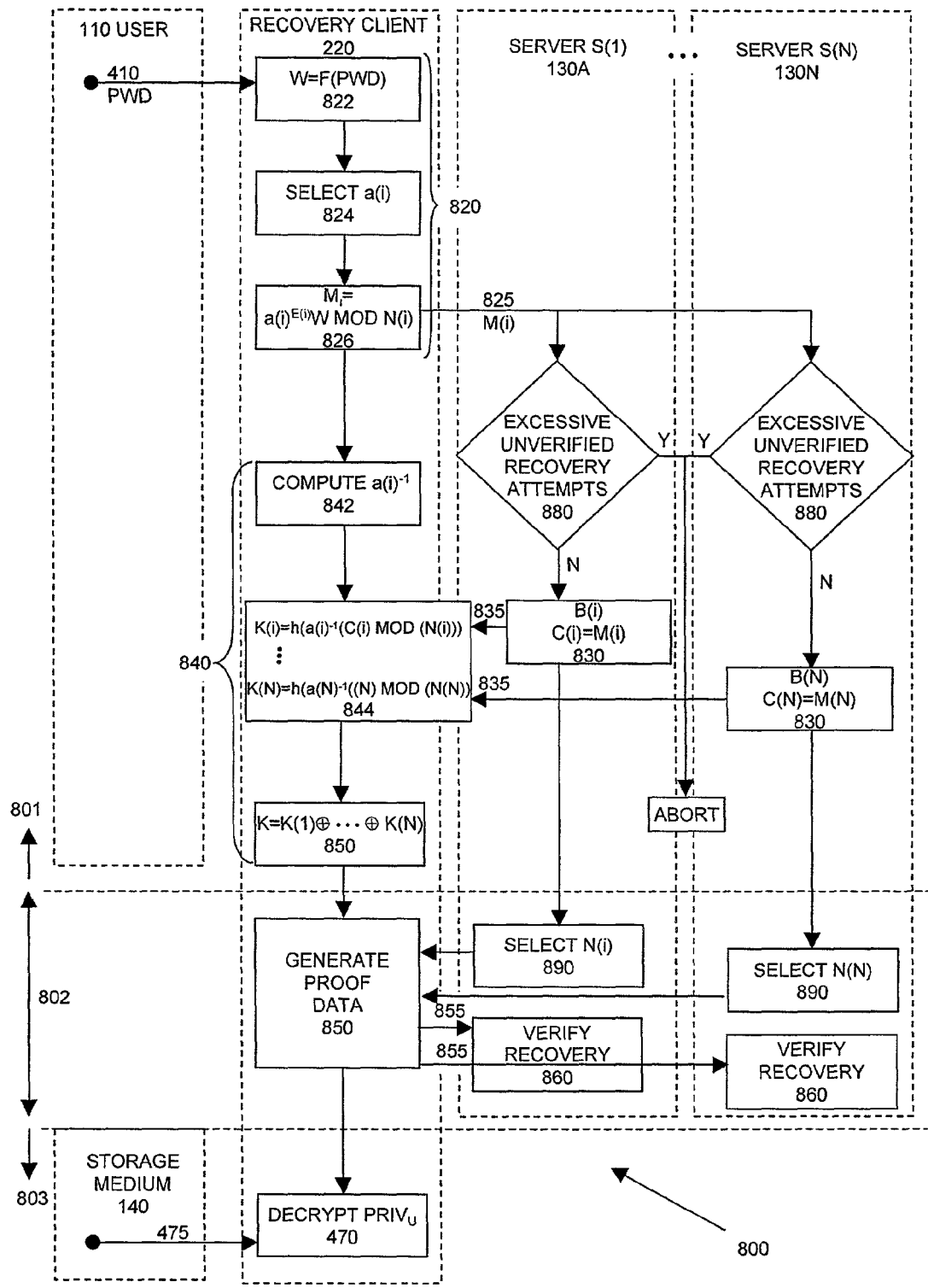
FIG. 8 is an event trace illustrating a method (800) for recovering strong secret data which has been initialized using method 700.

Referring to FIGS. 7 and 8, in embodiments 700 and 800 of methods 300 and 400, respectively, the blind function evaluation protocol is based on the RSA cryptosystem. The RSA cryptosystem is based on the problem of extracting roots modulo a composite, and is described in R. Rivest, A. Shamir, and L. Adleman, "A Method for Obtaining Digital Signatures and Public-key Cryptosystems," Communications of the ACM, 21(2) pp. 120-126, Feb. 1978, and in "PKCS #1: RSA Cryptography Specifications," Version 2.0, by B. Kaliski and J. Staddon, available at http://www.rsal-abs.com/pkcs/pkcs-1/index.html. The use of the RSA cryptosystem to perform blind signatures in the context of anonymous digial cash is described in D. Chaum, "Security Without Identification: Transaction Systems to Make Big Brother Obsolete," Communications of the ACM, 28 (1985), pp. 1030-1044. In these embodiments 700, 800, the value n(i) is defined as the product of two primes, p(i) and q(i) where i is an index for the servers 130. In addition, the function K(i) is given by $K(i)=g(w, b(i))=w^{b(i)} \bmod n$.

Referring first to FIG. 7, initializing method 700 may be broken down into the three general stages 701-703, analogous to stages 301-303 of method 300. The generation stage 701 begins the same as generation stage 301. The generating client 120 authenticates 710 the user as a legitimate user for account U. Next, the user's weak secret data PWD is determined 320.

Server secret data b(i) for user 110 is established 340 for each secret holding server S(i), where i is an index for the servers 130. In this embodiment the server secret data b(i) is the private exponent of an asymmetric cryptography public/private pair. The public exponent is represented by e(i) which is typically defined as a small integer relatively prime to LCM(p(i)−1, q(i)−1) where LCM stands for Least Common Multiple. The server secret data b(i) is defined by the relationship $b(i)=e(i)^{-1} \bmod \mathrm{LCM}(p(i)-1, q(i)-1)$. Typically, the server secret data b(i) is generated in combination with the public exponent e(i). In this embodiment, the public exponent e(i) is transmitted to a certificate server that provides authenticated versions of the public key e(i) for use by the generating 120 and recovery 220 client. Alternatively, the public exponent e(i) and the private exponent b(i) can be generated elsewhere (such as at a key generation server or the certificate server) and provided to the secret holding server S(i) and a certificate server. At the end of step 340, each secret holding server has securely stored 345 its server secret data b(i) for future use in regenerating the user's strong secret data.

The generating client 120 computes 730 the strong secret data K as follows. First the generating client 120 computes 732A w=f(PWD), where f is a one-way function generating an element of group G. At step 732B the generating client 120 generates a random value a(i) such that (1<a(i)<n−1) and gcd(a(i),n)=1. The value a(i) is relatively prime to n(i) so that an inverse of a(i) is guaranteed to exist. Next 732C the client computes $M(i)=a(i)^{e(i)}w \bmod n(i)$ for each server S(i) and transmits 732D the values to the servers S(i). Here, $a(i)^{e(i)}$ is a random element of $Z_n^*$, regardless of f(PWD).

Provided that f(PWD) is in $Z_n^*$, so that is does not contain a factor in common with n, the M(i) will be a random element of $Z_n^*$, so all values of M(i) are equally likely. As all values of a(i) are equally likely, multiplication by the value ai serves to blind the values of w mod n(i) with respect to the server S(i) and with respect to someone observing communications between the generating client 120 and the server S(i). Each server S(i) then 732E computes $c(i)=M(i)^{b(i)} \bmod n(i)$ and transmits 732F to the generating client 120.

Next a secret component K(i) is computed 734 for each secret holding server according to the relationship $K(i)=h(a(i)^{-1} c(i) \bmod n(i))=w^{b(i)}$. Part of this operation involves the generation of the inverses $a(i)^{-1}$ of the random values a(i). Multiplication by the inverse $a(i)^{-1}$ serves to unblind the result. As indicated above, the value for K(i) is $h(w^{b(i)}$ which is a result of the fact that in the RSA cryptosystem $M^{be} \bmod (n)=M^{eb} \bmod (n)=M^1 \bmod (n)$. In the expression above, h is a one-way function, such as a cryptographic hash function, which generates a value with suitably unbiased and uncorrelated bits, as might be suitable for use as a symmetric encryption key. Note that each secret component is a function of both the user's weak secret data and of the strong secret data for the corresponding secret holding server.

Once the generating client 120 has computed 734 the secret components K(i), it then computes 736 the strong secret K as a function of the secret-components K(i) of the participating secret holding servers S(i). In this example, the strong secret K is calculated 736 according to a bit-wise exclusive-OR, $K=K(1) \oplus K(2) \oplus \ldots \oplus K(N)$ where $\oplus$ denotes exclusive-OR, Binary addition and t-out-of-N threshold secret sharing methods are two other methods for combining the secret components K(i). In a t-out-of N threshold secret sharing method, there are N secret holding servers but the strong secret data can be computed from recovery data from only t of them, where t is less than N. Other methods can also be used.

In the storage stage 703, the strong secret data K is used as a cryptographic key in a symmetric cryptosystem to encrypt 370 a user's private data including a private key $\mathrm{Priv}_U$. The encrypted private data, denoted by EPD, which includes the encrypted private key, denoted by $E_K(\mathrm{Priv}_U)$, where $E_K$ means encrypted with key K, is stored 375 in storage medium 140.

In the verifier setup stage 702, the public key, $\mathrm{Pub}_U$, corresponding to the user's private key, $\mathrm{Priv}_U$, might be used as the verifier data v(i). In this embodiment, each secret holding server also plays the role of a verification server S(i) and stores 355 its verifier data $v(i)=\mathrm{Pub}_U$ or at least has access to the public key. In an alternate approach, the verifier data v(i)=h(K,Id(i)), where Id(i) is a unique but publicly known identifier for server S(i) and h is a one-way function such as a hash function. The inclusion of Id(i) ensures that different verifier data is produced for each verification server.

Referring now to FIG. 8, the recovery process 800 also includes three stages 801-803. In stage 801, the recovery client 220 recovers the user's strong secret K based on his weak secret PWD, with the assistance of the secret holding servers. In the verification stage 802, the recovery client 220 proves to the verification servers that it has successfully recovered the strong secret K. In stage 803, the recovery client 220 recovers the user's private key, $\mathrm{Priv}_U$.

Recovery 801 of the strong secret K begins with the recovery client 220 receiving 410 the user account identifier U and password PWD from the user 110. The recovery client 220 then regenerates the required secret components K(i) using the blind function evaluation protocol described above. In particular, the recovery client 220 computes 822 w=f(PWD), where f is the same one-way function used in the generation stage 700. The recovery client 220 selects 824 generates a random value a(i) that is relatively prime to n(i). The recovery client 220 then computes 826 the server request data M(i)=a(i)$^{e(i)}$w mod n(i) and transmits 825 this server request data to server S(i). Note that the server request data M(i) is a function of both the weak secret data PWD and of random value a(i). However, the server request data M(i) does not reveal information about the weak secret data PWD without knowledge of the random value a(i).

Server S(i) receives the server request data M(i). The server increments a counter of unverified recovery attempts for user account U and the current password PWD and determines 880 whether it is likely that a party without access to the password is attempting to regenerate the strong secret data. In this embodiment, it does so by determining whether the number of unverified recovery attempts exceeds a threshold. If it does, then the server disables the user account U and aborts the recovery process 800. Depending on the properties of the group G, the server may also verify that server request data M(i) is between 0 and n(i)−1. If M(i) is not between 0 and n(i)−1, then the server could abort the recovery process. If the recovery process has not been aborted, the server computes 830 the server response data c(i)=M(i)$^{b(i)}$ mod n(i) and sends 835 c(i) to the recovery client 220. The server also generates 890 a unique index N(i), or nonce, for this instantiation of the recovery process and transmits the nonce to the recovery client 220. The server sets a state variable indicating verification pending for nonce N(i). In a preferred approach, the server transmits to the recovery client 220 a single message, which is based on both the server response data c(i) and the nonce N(i). Similar to the server request data M(i), the server response data c(i) is a function of the server secret data b(i) for the secret holding server and of the server request data M(i) received. However, the server response data c(i) does not reveal information about the server secret data b(i).

Upon receipt of the message from the server, the recovery client 220 computes 842 the value a(i)$^{-1}$ that corresponds to a(i). It then computes 844 the secret component K(i)=h(a(i)$^{-1}$ c(i) mod n(i))=w$^{b(i)}$. Note that use of the random value a(i) makes the communications between recovery client 220 and secret holding server 130 resistant to attacks intended to deduce the weak secret data PWD or server secret data b(i). However, the secret component K(i) is a function of both the weak secret data PWD and server secret data b(i), but is independent of the random value a(i). Finally, the recovery client 220 computes 846 the strong secret data K=K(1)⊕K(2)⊕ . . . ⊕K(N). The recovery client 220 can then recover the user's private key Priv$_U$ by retrieving 475 and decrypting 470 EPD using the recovered cryptographic key K.

An advantage of the RSA-cryptosystem based blind function evaluation protocol is that it only involves one short exponentiation, one multiplication, and one modular inversion for each user/server combination. The modulus n(i) may be the same for more than one user provided that the exponents e(i) are different, so that protocol runs are specific to a particular user, thereby enabling throttling and other countermeasures. If the exponent e(i) varies for each user, the set of possible exponents should be pairwise relatively prime to LCM(p(i)−1,q(i)−1). It is also possible to have more than two primes in an implementation of the RSA cryptosystem. If n(i) is the product of J primes p(i,j), where j is the index of primes, then e(i) is relatively prime to LCM(p(i,1), p(i,2), . . . p(i,J)).

The security of the RSA blind function evaluation protocol 40″ depends on the modulus n(i) and the exponent e(i) forming a valid RSA public key such that n(i) is a product of two large primes, and e(i) is relatively prime to n(i). If n(i) is not a product of two large primes, it may be possible for an attacker to determine the value K(i) from f(WP), and if e(i) is not relatively prime to n(i), then information about f(WP) may be leaked from the server request a(i)$^{e(i)}$ f(WP).

In one embodiment, the server provides the n(i) and e(i) values to the client in a certificate, where the certificate associates the n and e values with the particular user. The certificate authority can assure that the n(i) and e(i) values are valid before issuing the certificate. To do this the certificate authority may, for example, use the methods and apparatus described in co-pending U.S. Ser. No. 09/188,963, entitled "Methods and Apparatus for Verifying the Cryptographic Security of a Selected Private and Public Key Pair Without Knowing the Private Key," by Liskov et al.

It should be noted that in the embodiments 700, 800 of FIGS. 7 and 8, proper selection of e may be more critical than selection of n as an improper selection of e may make it possible for someone who compromises a single server to attack the system.

In one embodiment, the values of K(i) are computed according to different protocols. This is possible because the K(i) values are combined by exclusive -ORing and therefore do not need to be in the same group. In this embodiment, some of the K(i) values are computed by a discrete-logarithm-based protocol, such as in methods 500 and 600, some of the K(i) values are computed by a an RSA-based protocol, such as in methods 700 and 800, and (optionally) some by another blind function evaluation protocol.

As mentioned previously, different verification approaches may be used. For example, —assume that the user's public key Pub$_U$ is used as the verifier data v(i). Then, the recovery client 220 can generate 850 proof data by digitally signing a message containing the various nonces N(i) using the user's recovered private key Priv$_U$. Each verification server verifies 860 successful recovery of the strong secret data K by verifying the digital signature using the user's public key Pub$_U$, and then verifying that the correct nonce N(i) is included in the message. On the other hand, assume that the verifier data v(i)=h(K, Id(i)). Then, the proof data can be computed according to the expression g(v(i), N(i)) where g is a one-way function such as a cryptographic hash function. The verification server verifies 860 the proof data by computing its own value from its own knowledge of v(i) and N(i), and comparing the result with the value received.

Upon receipt of the proof data, each server determines whether the state variable indicates verification pending for nonce N(i). If verification is pending, then the server verifies that the received proof data successfully demonstrates knowledge of strong secret K and freshness linked to nonce N(i). If both of these are verified, then the counter of unverified recovery attempts for user account U and password PWD are decremented. Otherwise, the recovery process is considered to be unsuccessful.

Methods 300, 400, 500, 600, 700 and 800 are particularly advantageous because they are resistant to many types of attacks, including attacks by or on the servers S(i). The following are some types of attacks and examples countermeasures.

An attacker may attempt to guess or otherwise compromise the user 110's password PWD. This may be combated by placing requirements on the choice of password PWD in order to reduce the chance that an attacker will guess the password. For example, the password may be required to have a minimum length or to be changed periodically. In another countermeasure, an attempt-threshold which limits the number of guesses at the password PWD is selected. Thus, an attacker has only a limited number of tries to guess the password PWD. If the attempt-threshold is exceeded, the generation process 500 preferably is re-executed, requiring a new password PWD and generating a new strong secret K, thus foiling the attacker. The attempt threshold preferably should be set so that, given the requirements placed on the password, the probability of a successful guessing attack is acceptably small while still balancing the reality that some unsuccessful attempts may be legitimate rather than the byproduct of an attack. For example, an unsuccessful attempt may be legitimately recorded in the absence of any attack, if the user 110 incorrectly types his password PWD and/or as a result of a communications or system failure.

Alternately, an attacker might try to compromise the protocol by computing w, a, and/or b(i) from the messages transmitted among the various components. However, in the discrete logarithm embodiments 500, 600, this attack may be defeated by selecting group G so as to be resistant to discrete-logarithm attacks. For example, when G is the set of integers modulo a prime p then p is selected so as to be a sufficiently strong Diffie-Hellman modulus (e.g., a safe prime) according to well-known rules. Then, such attacks will be infeasible due to the discrete logarithm problem. This is also true for an attacking server. It is infeasible for a server to compute w, a, and/or any b(i) other than its own. The selection of a strong prime p also results in a strong secret K, thus making it infeasible to directly attack ciphertext encrypted under the strong secret K.

In another type of attack, the attacker might pose as a recovery client and send weak server request data $M_1$ to the server S(i), with the intention of obtaining some information about the server secret data b(i) when the server returns the server response data $c(i)=M_1^{b(i)}$. The main known attack of this type relates to the small-subgroup attack on Diffie-Hellman cryptosystems. This can be averted by various means, including initial selection of prime p with suitable properties, such as a safe prime of the form p=2q+1 where q is a prime, and by making b(i) always an even number. Depending on the properties of the particular type of group G, the server S(i) can also check the strength of the received $M_1$ and refuse to respond if it recognizes it as a weak value.

In another type of attack, the attacker might pose as a server S(i), or corrupt a server S(i), and manipulate the protocol in a way that leaks information about a user's password. For instance, by manipulating the protocol so that the value K(i) returned is the same as the value w provided by the client, the attacker can cause the resulting keys derived from K(i) to depend directly on the password PWD. To avert this sort of attack, a "proof of correctness" can be used so that the client can determine whether the correct value of b(i) has been applied. If one of those keys is used to authenticate in a typical challenge-response protocol, the attacker will be able to verify whether password guesses are correct. In the embodiments using the RSA cryptosystem, the "proof" is built into the cryptosystem. The client simply checks that $K(i)=f(PWD)_{e(i)} \mod n(i)$. This is much simpler than a proof of correctness.

An attacker might attempt to close down or force a password change on a user account or multiple accounts supported by a server S(i) by either sending repeated false server request data $M_1$ or by disrupting protocols by, for example, intercepting and discarding messages conveying server response data or proof data. The goal of this attack is to cause the server to disable one or more user accounts. The impact of this attack can be reduced by having servers S(i) "throttle" the processing of repeated Ml requests for a user account. That is, the server S(i) suspends or delays processing for a user account in the face of multiple unsuccessful attempts during some time period.

Alternately, an attacker might attempt to overload a server S(i) by sending massive numbers of false $M_1$ to the server, thus causing it to perform massive numbers of useless but computationally intensive exponentiations. To the extent such attempts are for the same user account, throttling (as discussed above) will significantly combat this attack. Thus, the attack is viable primarily if large numbers of different user accounts are used. Hence, it can be resisted by malting it difficult to guess a valid user account identifier U, for example by avoiding user account identifiers drawn from a simple number sequence.

As a final example, a communications or system failure at one server might cause multiple recovery protocol failures at the other servers, resulting in the unnecessary disabling and forced password-change of one or more user accounts. To reduce this problem, servers preferably should be designed for high availability, with appropriate redundancy of systems and communications paths. In addition, if one server unavoidably fails, management controls may temporarily suspend operation of the other servers. Throttling (as discussed above) will also reduce the incidence of account disabling.

The above description is included to illustrate the operation of the preferred embodiments and is not meant to limit the scope of the invention. From the above discussion, many variations will be apparent to one skilled in the art that would be encompassed by the spirit and scope of the present invention.

For example, the presence of a hardware token may be required in order to complete recovery process 400. In one approach, recovery client 220 determines whether the user's hardware token is present and, if it is, the recovery client 220 then transmits data attesting to or proving this fact to each secret holding server. The servers, in turn, participate in the regeneration process only if they receive this data from the recovery client 220. When used in conjunction with a hardware token, such as a challenge-response token or time-synchronized one-time password generator, in such a way that the recovery client 220 additionally proves possession of the token to one or more servers, the resulting combination of methods can effectively serve in place of a smartcard method in which a strong secret is recovered from the smartcard in response to presentation of a user weak secret such as a PIN. The advantage of the former approach over the smartcard approach is a possible major reduction in deployment and maintenance cost since the aforementioned types of tokens do not require special hardware interfaces, as are required by smartcards.

Hence, the scope of the invention is to be limited only by the following claims.

What is claimed is:

1. A method involving a client and a group of one or more servers for deriving a strong secret from a first secret, the method comprising:
providing each server of the group with a respective server secret;
for each server of the group, participating in a blind function evaluation protocol to generate a respective strong secret component, the blind function evaluation protocol evaluating a function taking as input the respective server secret and client information derived from the first secret, and generating as output the respective strong secret component;

generating the strong secret from the strong secret components generated for the group of one or more servers; and using the strong secret to perform a cryptographic function, wherein the blind function evaluation protocol is characterized in that the client cannot determine any of the respective server secrets and in that each server cannot determine the first secret, any other respective strong secret component, or the strong secret, wherein the blind function evaluation protocol is selected from a set of blind function evaluation protocols that excludes any protocol involving:

the client computing server request data by exponentiating the client information to a random first integer a, wherein the client information is an element w of a finite group G in which exponentiation is efficient but the discrete logarithm problem is computationally infeasible;

the server computing server response data from the server request data and the server secret, wherein the server response data comprises a value c in the group G; and the client computing a strong secret component by exponentiating the value c to a second integer a', wherein the first and second integers a and a' are such that $x^{aa'}=x$ for all x in the group G.

2. The method of claim 1, further comprising the steps of:
obtaining by the client an encrypted secret;
deriving a decryption key from one or more of the strong secret components using a key derivation function; and
decrypting the encrypted secret using the decryption key.

3. The method of claim 1 wherein the first secret is a PIN or password.

4. The method of claim 1 wherein the function for at least one of the servers comprises $h(w^{b(i)} \mod n(i))$, where i is an index for each of the at least one servers, b(i) comprises the respective server secret for server i, w is the result of a mask generation function or hash function applied to the first secret, and h denotes a one-way function.

5. The method of claim 1 wherein the function for at least one of the servers comprises $w^{b(i)} \mod n(i)$, where i is an index for each of the at least one servers, b(i) comprises the respective server secret for server i, w is the result of a mask generation function or hash function applied to the first secret, and h denotes a one-way function.

6. The method of claim 1 wherein the blind function evaluation protocol for at least one of the servers comprises the client sending $a(i)^{e(i)} w \mod n(i)$, where i is an index for each of the at least one servers, a(i) is an integer relatively prime to n(i), and w is the result of a mask generation function or a hash function applied to the first secret.

7. The method of claim 6 wherein e(i) is an integer that is relatively prime to LCM(p(i)−1, q(i)−1), where LCM stands for Least Common Multiple, and p(i) and q(i) are two primes whose product is the modulus n(i).

8. The method of claim 7 wherein the server secret b(i) for at least one server i is generated such that b(i) =e(i)⁻mod LCM(p(i)−1, q(i)−1).

9. The method of claim 6 wherein e(i) is an integer that is relatively prime to LCM(p(i,1)−1 . . . p(i,J)−1), where LCM stands for Least Common Multiple, and {p(i,1), p(i,2) . . . p(i,J)} are J primes whose product is the modulus n(i).

10. The method of claim 1 further comprising the step of verifying the successful recovery of the strong secret by the client.

11. The method of claim 1 wherein the strong secret comprises $K(1) \oplus K(2) \oplus \ldots \oplus K(N)$, where $\oplus$ denotes the exclusive-OR operation, K(i) denotes the strong secret component for each server i, and N denotes the number of servers.

12. The method of claim 1 wherein the strong secret comprises K(1)+K(2)+ . . . +K(N), wherein + denotes binary addition, K(i) denotes the strong secret component for each server i, and N denotes the number of servers.

13. The method of claim 1 wherein the strong secret comprises K(1)*K(2)* . . . K(N), wherein * denotes modular multiplication, K(i) denotes the strong secret component for each server i, and N denotes the number of servers.

14. The method of claim 1 wherein the strong secret comprises a combination of values using t-out-of-N threshold secret sharing, wherein the shares are encrypted using the strong secret component values.

15. The method of claim 1 wherein at least one strong secret component is derived using a blind function evaluation protocol based on the problem of extracting roots modulo a composite.

16. The method of claim 1 wherein the function for at least one of the servers comprises h(w, b(i)), where i is an index for each of the at least one servers, b(i) comprises the respective server secret for server i, w is the result of a mask generation function or hash function applied to the first secret, and h denotes a one-way function.

17. The method of claim 16 wherein the blind function evaluation protocol comprises the server constructing a circuit and communicating the circuit to the client, and wherein the client evaluates the circuit with w as the first input value.

18. The method of claim 17 wherein the blind function evaluation protocol comprises an oblivious transfer.

19. The method of claim 18 wherein the client cannot evaluate the circuit for more than one input.

20. The method of claim 1, wherein the cryptographic function is one of decryption, authentication, and creating a digital signature.

21. A system for decrypting encrypted secrets using a first secret, comprising:

a client and a group of one or more servers, each server of the group comprising a respective server secret and a blind function evaluator for participating in a blind function evaluation protocol with the client, the blind function evaluation protocol resulting in the generation of a strong secret component revealed to the client but not to any of the other servers of the group, the blind function evaluator evaluating a function taking as input the respective server secret and client information derived from the first secret, and generating as output the respective strong secret component, the client generating the strong secret from the strong secret components generated for the group of servers and using the strong secret to decrypt an encrypted secret, wherein the blind function evaluation protocol is characterized in that the client cannot determine any of the respective server secrets and in that each server cannot determine any other respective strong secret component or the strong secret, wherein the blind function evaluation protocol is selected from a set of blind function evaluation protocols that excludes any protocol involving:

the client computing server request data by exponentiating the client information to a random first integer a, wherein the client information is an element w of a finite group G in which exponentiation is efficient but the discrete logarithm problem is computationally infeasible;

the server computing server response data from the server request data and the server secret, wherein the server response data comprises a value c in the group G; and the client computing a strong secret component by exponentiating the value c to a second integer a', wherein the first and second integers a and a' are such that $z^{aa'}=x$ for all x in the group G.

22. The system of claim 21 further comprising a data store storing an encrypted secret capable of being decrypted with a key derived from the strong secret, the data store accessible to the client over a communications network.

23. The system of claim 21 wherein the function for at least one of the servers comprises $w^{b(i)}$ mod n(i), where i is an index for each of the at least one servers, b(i) comprises the respective server secret for server i, and w is the result of a mask generation function or hash function applied to the first secret.

24. The system of claim 21 wherein the function for at least one of servers comprises $h(w^{b(i)}$ mod n(i)), where i is an index for each of the at least one servers, b(i) comprises the respective server secret for server i, w is the result of a mask generation function or hash function applied to the first secret, and h denotes a one-way function.

25. The system of claim 21 wherein the blind function evaluation protocol for at least one of the servers comprises the client sending $a(i)^{e(1)}$ w mod n(i) to at least one of the at least one servers, where i is an index for the server, a(i) is an integer relatively prime to n(i), and w is the result of a mask generation function or a hash function applied to the first secret.

26. The system of claim 25 wherein e(i) is small integer that is relatively prime to the least common multiple of (p(i)−1) and (q(i)−1), and p(i) and q(i) are two primes whose product is the modulus n(i).

27. The system of claim 26 wherein the server secret b(i) for at least one server i is generated such that $b(i)=e(i)^{-1}$ mod LCM(p(i)−1, q(i)−1), where LCM denotes the least common multiple.

28. The system of claim 25 wherein e(i) is small integer that is relatively prime to the least common multiple of (p(i,1)−1) . . . (p(i,J)−1), where (p(i,J)−1) . . . (p(i,J)−1) are J primes whose product is the modulus n(i).

29. The system of claim 21 further comprising a verifier for verifying the successful recovery of the strong secret.

30. The system of claim 21 wherein the strong secret comprises K(1)⊕K(2)⊕ . . . ⊕K(N), wherein ⊕ denotes the exclusive-OR operation, K(i) denotes the strong secret component for each server i, and N denotes the number of servers.

31. The system of claim 21 wherein the strong secret comprises K(1)+K(2)+ . . . +K(N), wherein + denotes binary addition, K(i) denotes the strong secret component for each server i, and N denotes the number of servers.

32. The system of claim 21 wherein the strong secret comprises K(1)*K(2)* . . . * K(N), wherein * denotes modular multiplication, K(i) denotes the strong secret component for each server i, and N denotes the number of servers.

33. The system of claim 21 wherein the strong secret comprises a combination of values using t-out-of-N threshold secret sharing, wherein the shares are encrypted using the strong secret component values.

34. The system of claim 21 wherein at least one strong secret component is derived using a blind function evaluation protocol based on the problem of extracting roots modulo a composite.

35. The system of claim 21 wherein the function for at least one of the servers comprises h(w, b(i)), where i is an index for each of the at least one servers, b(i) comprises the respective server secret for server i, w is the result of a mask generation function or hash function applied to the first secret, and h denotes a one-way function.

36. The system of claim 35 wherein the blind function evaluation protocol comprises the server constructing a circuit and communicating the circuit to the client, and wherein the client evaluates the circuit with w as the first input value.

37. The system of claim 36 wherein the blind function evaluation protocol comprises an oblivious transfer.

38. The method of claim 37 wherein the client cannot evaluate the circuit for more than one input.

39. A system for decrypting encrypted secrets using a first secret, comprising:

a client in communication with a group of one or more servers, each server of the group comprising a respective server secret and a blind function evaluator for participating in a blind function evaluation protocol with the client, the blind function evaluation protocol resulting in the generation of a strong secret component revealed to the client but not the servers, the evaluator evaluating a function taking as input the respective server secret and client information derived from the first secret, and generating as output a respective strong secret component, the client generating the strong secret from the strong secret components generated for the group of servers, wherein the blind function evaluation protocol is characterized in that the client cannot determine any of the respective server secrets and in that each server cannot determine either another respective strong secret component or the strong secret, wherein the blind function evaluation protocol is selected from a set of blind function evaluation protocols that excludes any protocol involving:

the client computing server request data by exponentiating the client information to a random first integer a, wherein the client information is an element w of a finite group G in which exponentiation is efficient but the discrete logarithm problem is computationally infeasible;

the server computing server response data from the server request data and the server secret, wherein the server response data comprises a value c in the group G; and the client computing a strong secret component by exponentiating the value c to a second integer a', wherein the first and second integers a and a' are such that $x^{aa'}=x$ for all x in the group C, the client comprising:

a receiver for receiving encrypted secrets;

a decryption function for decrypting the encrypted secrets with a key derived from the strong secret.

40. The system of claim 21 wherein the client comprises a requesting component and a recovery component.

* * * * *

UNITED STATES PATENT AND TRADEMARK OFFICE
CERTIFICATE OF CORRECTION

PATENT NO.         : 7,359,507 B2
APPLICATION NO. : 09/804460
DATED               : April 15, 2008
INVENTOR(S)       : Burton S. Kaliski It is certified that error appears in the above-identified patent and that said Letters Patent is hereby corrected as shown below:

Claim 8, Column 27, Line 59, "b(i) = e(i)-" should read -- b(i) = e(i)-1 --.

Claim 21, Column 29, Line 11, "$x^{\underline{a}\,\underline{a}}$'" should read -- $z^{\underline{a}\,\underline{a}}$' --.

Claim 28, Column 29, Line 45, "(p(i, J)- 1)" should read -- (p(i, 1)- 1) --.

Claim 39, Column 30, Line 57, "C," should read -- G, --.

Signed and Sealed this

Fifth Day of August, 2008

JON W. DUDAS
*Director of the United States Patent and Trademark Office*